(12) United States Patent
Miki

(10) Patent No.: US 7,269,611 B2
(45) Date of Patent: Sep. 11, 2007

(54) STORAGE SYSTEM AND STORAGE SYSTEM CONTROL METHOD

(75) Inventor: Kenichi Miki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 276 days.

(21) Appl. No.: 10/915,557

(22) Filed: Aug. 11, 2004

(65) Prior Publication Data
US 2005/0289553 A1 Dec. 29, 2005

(30) Foreign Application Priority Data
Jun. 23, 2004 (JP) ............................. 2004-184524

(51) Int. Cl.
*G06F 17/30* (2006.01)
(52) U.S. Cl. ........................ 707/204; 707/200; 707/10; 714/6
(58) Field of Classification Search ...................... None
See application file for complete search history.

(56) References Cited

U.S. PATENT DOCUMENTS

| | | | |
|---|---|---|---|
| 5,742,792 A | 4/1998 | Yanai et al. | |
| 6,209,002 B1 * | 3/2001 | Gagne et al. | 707/204 |
| 6,304,980 B1 | 10/2001 | Beardsley et al. | |
| 6,654,912 B1 | 11/2003 | Viswanathan et al. | |
| 6,880,052 B2 * | 4/2005 | Lubbers et al. | 711/162 |
| 7,047,256 B2 * | 5/2006 | Miki et al. | 707/200 |
| 2003/0051111 A1 | 3/2003 | Nakano et al. | |
| 2004/0039959 A1 | 2/2004 | LeCrone et al. | |
| 2005/0154937 A1 * | 7/2005 | Achiwa | 714/6 |

* cited by examiner

*Primary Examiner*—Charles Rones
*Assistant Examiner*—Belix M Ortiz
(74) *Attorney, Agent, or Firm*—Reed Smith LLP; Stanley P. Fisher, Esq.; Juan Carlos A. Marquez, Esq.

(57) ABSTRACT

The present invention prevents erroneous control performed on the basis of volumes storing old data in cases where trouble occurs in remote copying. The storage system is constructed by connecting a first site 1A and second site 1B with networks CN1 and CN2. Reference designating parts 5 are disposed in respective host computers 3A1, 3B1 and the like. In cases where trouble occurs in remote copying, the reference designating parts 5 specify and manage the site (volume) in which the most recent data is stored. As a result, failover or the like can be performed within a site that can utilize the most recent data following the occurrence of trouble in remote copying.

20 Claims, 30 Drawing Sheets

FIG.1
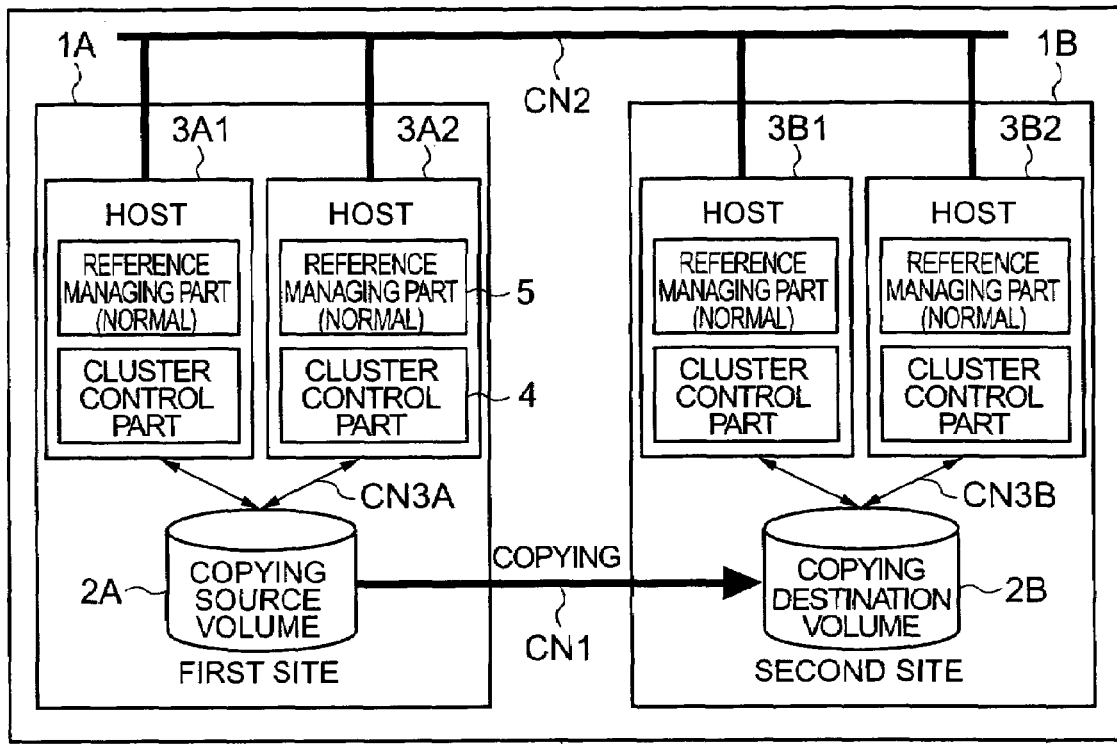
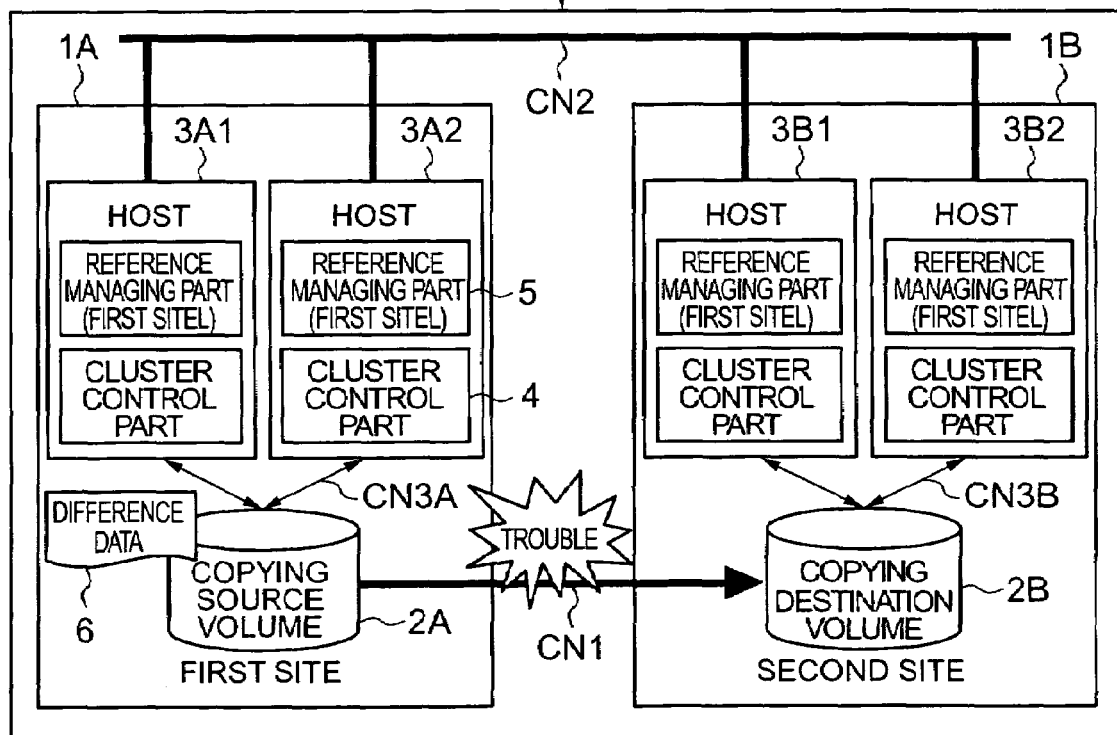

FIG.6

| DATA FRESHNESS MANAGEMENT INFORMATION | | | ~31 |
|---|---|---|---|
| COPYING PAIR NO. | TIME | PAIR REFERENCE STATE | |
| PAIR VOLUME #1 | 00:00:00 | NORMAL | |
| PAIR VOLUME #2 | 00:01:00 | FIRST SITE | |
| PAIR VOLUME #3 | 00:02:00 | SECOND SITE | |
| ⋮ | ⋮ | ⋮ | |

| UPDATING MANAGEMENT INFORMATION | | | ~32 |
|---|---|---|---|
| COPYING PAIR NO. | SHARED HOST NAME | RESULT OF UPDATING | |
| PAIR VOLUME #1 | HOST H1 | — | |
|  | HOST H2 | NOT PERFORMED | |
|  | HOST H3 | NOT PERFORMED | |
| PAIR VOLUME #2 | HOST H1 | — | |
|  | HOST H2 | SUCCESS | |
|  | HOST H3 | FAILURE | |
|  | HOST H4 | NOT PERFORMED | |
| PAIR VOLUME #3 | HOST H1 | — | |
|  | HOST H2 | NOT PERFORMED | |
|  | HOST H3 | NOT PERFORMED | |
| ⋮ | ⋮ | ⋮ | |

| DATA FRESHNESS MANAGEMENT INFORMATION | | | |
|---|---|---|---|
| COPYING PAIR NO. | TIME | PAIR REFERENCE STATE | POLICY |
| PAIR VOLUME #1 | 00:00:00 | NORMAL | FIRST SITE |
| PAIR VOLUME #2 | 00:01:00 | FIRST SITE | OPERATING SITE BEFORE TROUBLE |
| PAIR VOLUME #3 | 00:02:00 | SECOND SITE | STANDBY SITE BEFORE TROUBLE |
| ⋮ | ⋮ | ⋮ | ⋮ |

32A

| UPDATING MANAGEMENT INFORMATION | | | |
|---|---|---|---|
| COPYING PAIR NO. | SHARED HOST NAME | SITE TO WHICH HOST BELONGS | UPDATING RESULTS |
| PAIR VOLUME #1 | HOST H1 | FIRST SITE | — |
|  | HOST H2 | FIRST SITE | NOT PERFORMED |
|  | HOST H3 | SECOND SITE | NOT PERFORMED |
| PAIR VOLUME #2 | HOST H1 | FIRST SITE | — |
|  | HOST H2 | FIRST SITE | NOT PERFORMED |
|  | HOST H3 | SECOND SITE | NOT PERFORMED |
|  | HOST H4 | SECOND SITE | NOT PERFORMED |
| PAIR VOLUME #3 | HOST H1 | FIRST SITE | — |
|  | HOST H2 | FIRST SITE | NOT PERFORMED |
|  | HOST H3 | SECOND SITE | NOT PERFORMED |
| ⋮ | ⋮ | ⋮ | ⋮ | of application, each having a plurality of embedded text fields rendered in two-column layout.

STORAGE SYSTEM AND STORAGE SYSTEM CONTROL METHOD

CROSS-REFERENCE TO RELATED APPLICATIONS

This application relates to and claims priority from Japanese Patent Application No. 2004-184524 file on Jun. 23, 2004, the entire disclosure of which is incorporated herein by reference.

BACKGROUND OF THE INVENTION

1. Field of the Invention

The present invention relates to a storage system and storage system control method.

2. Description of the Related Art

Storage systems are known in which respective storage devices are installed in a plurality of geographically separated sites, and the respective sites are connected to each other via a communications network (U.S. Pat. No. 5,742,792). In such storage systems, the memory contents of the storage devices installed at the respective sites are matched by a technique called remote copying. Accordingly, even in cases where some site becomes unusable, the business service [of this site] can be continuously provide by utilizing the remaining normal sites.

Remote copying refers to a technique for matching the memory contents(data) of a plurality of physically separated storage devices without interposing a host computer or server as a higher device. In cases where remote copying imaging signal processing circuit performed, a logical volume constituting the copying source is prepared inside the storage device of one site, and a logical volume that constitutes the copying destination is prepared in the storage device of another site. These two logical volumes form a copying pair. In cases where data is updated on the logical volume of the copying source, this updating is reflected in the logical volume of the copying destination.

Furthermore, a cluster system is also known in which a single aggregate is formed by loosely coupling a plurality of servers so as to form a single server in apparent terms, and a service is provided to the client machines.

In cases where data contents are synchronized among a plurality of physically separated sites, and a storage service is provided to respective separate servers at each of the respective sites, the data cannot be synchronized among the respective sites if trouble occurs in remote copying function. Accordingly, differences are generated in the data contents among the respective sites. If a storage service is provided in such a state, there is a possibility that erroneous operation will be performed using old data groups in which updated data is not reflected in the site that has the copying destination logical volume.

It is also conceivable that a cluster system might be used in addition to a remote copying technique in order to improve the resistance to trouble. However, in a cluster system, a shared logical volume is simply used exclusively by a failover source server and a failover destination server. In the case of a cluster system, the shared logical volume is merely recognized as a single volume; no consideration is given to the question of whether or not data is synchronized among different logical volumes installed in separate sites. Accordingly, an effective disaster recovery system cannot be constructed merely by combining a cluster system and a remote copying system.

SUMMARY OF THE INVENTION

Accordingly, it is an object of the present invention to provide a storage system and storage system control method which are devised so that erroneous operation can be prevented in advance, thus making it possible to improve reliability, even in cases where trouble occurs in the processing that synchronizes the memory contents among storage devices respectively installed in a plurality of sites. Furthermore, it is an object of the present invention to provide a storage system and storage system control method that make it possible to match failover processing and synchronization processing so that an effective disaster recovery system can be constructed. Furthermore, it is an object of the present invention to provide a storage system and storage system control method which are devised so that storage devices that hold the most recent data groups can be specified with a necessary timing, thus making it possible to improve durability against synchronization trouble, without placing an excessive burden on the host computer or network. Other objects of the present invention will become clear from the description of embodiments below.

In order to solve the abovementioned problems, the storage system of the present invention comprises a plurality of sites in which a plurality of host computers and storage devices that respectively provide logical volumes to these respective host computers are installed, an inter-site network that connects the respective sites to each other so that communications are possible, a synchronizing part that synchronizes the logical volumes of the respective storage devices via the inter-site network, a reference managing part which manages reference designating information that is used to designate the storage device that is to be used as a reference in cases where synchronization trouble occurs in the processing that is performed by the synchronizing part, and a control part that controls the use of the logical volumes on the basis of the reference designating information.

The plurality of sites are physically separated, and are connected via the inter-site network so that communications are possible. A plurality of host computers and one or more storage devices are installed in each site. For example, the respective storage devices can be constructed as disk array devices comprising a plurality of storage devices such as hard disk drives, semiconductor memory drives, optical disk drives or the like. Logical volumes that constitute logical memory regions are formed in the physical memory regions that are provided by the plurality of storage devices. Within each site, the respective host computers access the respectively assigned logical volumes, and perform the reading and writing of data.

The memory contents of the logical volumes that are designated as objects of synchronization among the logical volumes of the respective sites are synchronized by the synchronizing part either periodically or non-periodically. Specifically, one logical volume is set as a copying source, another logical volume is set as a copying destination, and the synchronizing part transfers the data that is updated in the copying source logical volume to the copying destination logical volume, and causes this data to be written into the copying destination logical volume. Such processing that matches the memory contents among physically separated sites is called a remote copying technique. By respectively writing the same updated data into both logical volumes, it is possible to match the memory content of the copying source logical volume and the memory content of the copying destination logical volume. In regard to the timing at which the updated data is reflected in the copying destination logical volume, both a synchronous system and an asynchronous system are known. Details will be described later; however, in the case of the synchronous system, updated data is written into the copying destination logical volume at substantially the same time that updated data is written into the copying source logical volume. In the case of the asynchronous system, updated data is written into the copying destination logical volume at a specified timing after updated data has been written into the copying source logical volume.

For example, there may be cases in which synchronization processing cannot be performed normally because of communications trouble in the inter-site network, trouble within the storage devices or the like. Here, trouble that has an effect on the normal performance of synchronization processing is called synchronization trouble. The reference managing part manages reference designating information. The term "reference designating information" refers to information that designates the storage device that acts as a reference in cases where synchronization trouble occurs.

For example, in cases where data is coped from the logical volume at one site (copying source) to the logical volume at another site (copying destination), if trouble occurs in the synchronization processing, the updated content in the copying source logical volume cannot be reflected in the copying destination logical volume. In this case, the logical volume that holds the most recent data is the copying source logical volume, and old data produced prior to the occurrence of synchronization trouble is held in the copying destination logical volume. Accordingly, in this case, the storage device that has the copying source logical volume is the storage device that acts as a reference. Specifically, the reference designating information is information that is used to specify the storage device that holds the most recent data (or the site of this storage device or logical volume possessed by this storage device). When synchronization trouble occurs, the logical volume holding the most recent data (of the two logical volumes) can be judged by referring to the reference designating information. Accordingly, the control part can perform a control action such as stopping access to the logical volume holding the old data.

The [abovementioned] synchronizing part, reference managing part and control part are respectively installed in each site. These respective parts can also be installed in each host computer at each site. Alternatively, the synchronizing part and control part can be respectively installed in each host computer at each site, and the reference managing part can be installed in the storage device at each site.

A single cluster can be formed on the whole by the respective host computers at each site. Furthermore, the control part can control failover processing that causes the specified service provided by the host computer in which trouble has occurred to be continued by other normal host computers. In cases where the function of a currently operating host computer is stopped, the information processing service (business processing service) that was provided to client machines from this host computer is taken over by a standby host computer. This standby host computer receives the authorization to use the logical volume that was used by the host computer whose function was stopped, and various types of network setting information such as IP addresses and the like, and restarts the information processing service to the client machines. Processing that causes the performance of the information processing service to be transferred from the currently used host computer whose function was stopped to the standby host computer is called failover processing. Processing that returns the information processing service to the currently used host computer from the standby host computer when the function of the currently used host computer recovers is called failback processing.

The control part can perform failover processing or the like on the basis of the reference designating information. For example, in cases where synchronization trouble occurs so that the memory contents do not match among the plurality of logical volumes forming a copying pair, a host computer that can utilize the logical volume in which the most recent data is stored performs failover processing.

The reference managing part can respectively send notification of the reference designating information to specified sites that require notification of the reference designating information (among the respective sites). For example, in cases where reference managing parts are respectively installed in the respective sites, since the occurrence of synchronization trouble has already been recognized for sites in which synchronization trouble has occurred, no notification is required in the case of these sites. The term "specified sites requiring notification of the reference designating information" refers to sites other than the site in which synchronization trouble has occurred. In sites that have received notification, for example, the reference designating information can be stored in a reference designating information memory part that can be constructed from a semiconductor memory, hard disk drive or the like.

Cases in which sites receive a plurality of notifications are also conceivable. In such cases, some of the sites receiving a plurality of notifications may hold older reference designating information. Such older reference designating information is information that was issued earlier; in the case of sites that have issued such older reference designating information, it is conceivable that differences from the updated data may have accumulated. Accordingly, older reference designating information is used.

In cases where notification to specified sites by the reference managing part has been normally completed, the use of the logical volumes can be allowed. Specifically, after all of the sites that have the most recent data have been recognized, the use of the logical volumes can be allowed. Subsequently, for example, in cases where failover processing is performed, a judgement is made as to whether or not the respective host computers of the respective sites have stored the most recent data in the logical volumes used by the host computers themselves, and a determination is made as to whether or not these host computers can operate as failover destination host computers.

Information indicating preferential sites can also be cause to correspond to the reference designating information. Furthermore, even in cases where notification to specified sites by the reference managing part has not been normally completed, the use of the logical volumes can be allowed in cases where notification to preferential sites has been normally completed.

The respective sites are respectively notified of the most recent reference designating information, and this information is respectively held by the respective sites; however, for example, there may also be cases in which notification to some of the sites is not completed in a normal manner as a result of the occurrence of communications trouble or the like. Accordingly, even in cases where notification to all of the sites has not been completed, the use of the logical volumes is allowed if notification to preset preferential sites has been completed in a normal manner. The term "preferential site" refers to a site that is preferentially selected as a reference in cases where synchronization trouble occurs; such sites are preset by the system manager or the like.

One or a plurality of types of sites that are specified sites designated beforehand, sites that are operating prior to the occurrence of trouble and sites that are on standby prior to the occurrence of trouble may be set as preferential sites. For example, any single site among a plurality of sites may be set as preferential site. For instance, sites that were providing an information processing service prior to the occurrence of synchronization trouble (i. e., operating sites) can be set beforehand as preferential sites. Or, for example, sites that were standby sites prior to the occurrence of synchronization trouble can be set beforehand as preferential sites. The reference designating information can be respectively set for each pair of logical volumes constituting the object of synchronization processing. Accordingly, in cases where a plurality of pairs of logical volumes constituting the object of synchronization processing exist, respectively different preferential sites can be set for each pair.

The reference managing part can update the reference designating information in cases where the occurrence of synchronization trouble is detected. For example, a construction is conceivable in which the reference designating information is updated at specified time intervals even prior to the occurrence of synchronization trouble, and the respective sites are notified [of this updated information]. In this case, however, there is a possibility that updating processing of the reference designating information, notification processing of the reference designating information and processing that receives and stores the reference designating information in memory will be frequently performed, although this differs according to the updating period and the like. Accordingly, the load on the host computers and communications networks is increased. Furthermore, the utilization of the reference designating information at the respective sites follows the occurrence of synchronization trouble. Accordingly, in cases where the occurrence of synchronization trouble is detected, the reference designating information is updated. As a result, the reference designating information can be updated (produced) without placing a great load on the host computers and the like. Furthermore, the present invention is not an invention in which a construction that produces or updates the reference designating information prior to the occurrence of synchronization trouble is intentionally abandoned. According to the description in the claims, such a construction is also included in the present invention.

The inter-site network can be constructed so that this network includes a network between storage devices which connects the storage devices of the respective sites to each other so that communications are possible, and a network between host computers which connects the respective host computers of the respective sites to each other so that communications are possible. Furthermore, the synchronizing part synchronizes the logical volumes of the respective storage devices via the network between storage devices, and the reference managing part respectively sends a notification of the reference designating information to specified sites that require a notification of the reference designating information (among the respective sites) via the network between host computers. Thus, even in cases where synchronization trouble occurs as a result of trouble in the network between storage devices, the respective sites can be notified of the reference designating information by notifying these respective sites of the reference designating information via a network that is separate from the network used in synchronization processing.

The inter-site network may also include a network between intra-site networks which connects (in a manner that allows communications) intra-site networks that connect the respective host computers and the storage device within each site so that communications are possible. Furthermore, the reference managing part can respectively send notification of the reference designating information to specified sites that require the notification of this reference designating information (among the respective sites) via either the network between host computers or the network between intra-site networks.

A construction may also be used in which the reference designating information is held only in specified host computers among the respective host computers of the respective sites, and the other host computers utilize the reference designating information by accessing the specified host computers.

In cases where the synchronization trouble is eliminated, the synchronizing part can also perform synchronization processing with the storage device indicated in the reference designating information used as the copying source storage device. As a result, the most recent data can be transferred to other storage devices from the storage device storing the most recent data, and the memory contents of both storage devices can be matched, following recovery from the trouble.

Furthermore, in cases where the synchronization processing following recovery from the trouble is completed in a normal manner, the reference managing part can reset the reference designating information.

For example, there may be cases in which some or all of the functions, means and steps of the present invention can be constructed as computer programs that are executed by a micro-computer. Moreover, such computer programs can be fixed and distributed in a memory medium such as a hard disk, optical disk, semiconductor memory or the like. Alternatively, computer programs can be distributed via a communications network such as the internet or the like.

BRIEF DESCRIPTION OF THE DRAWINGS

FIG. 1 is an explanatory diagram which shows the schematic concept of an embodiment of the present invention;

FIG. 6 is an explanatory diagram which shows the construction of the freshness management information and updating management information;

FIG. 18 is an explanatory diagram which shows the construction of the freshness management information and updating management information;

DESCRIPTION OF THE PREFERRED EMBODIMENTS

Figure 2:
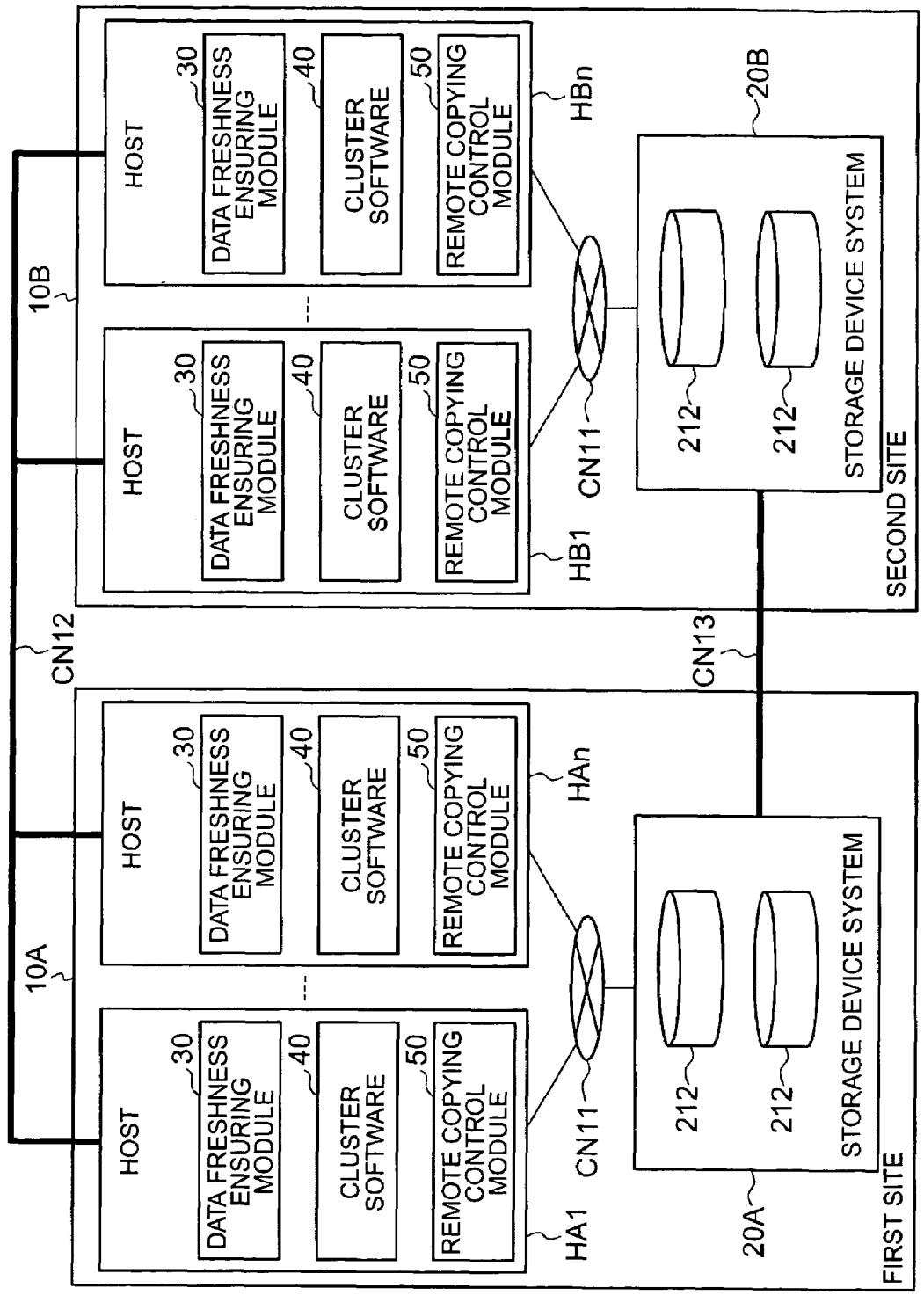
FIG. 2 is an overall structural diagram of a storage system constituting a first embodiment.

Embodiments of the present invention will be described below with reference to the attached figures. FIG. 1 is an overall schematic diagram of the present embodiment. Details will be described later; however, as is shown in FIG. 1, the storage system of the present embodiment comprises a first site (1A) which has a plurality of first host computers (3A1, 3A2) and a first storage device (2A) that respectively provides logical volumes to these respective first host computers (3A1, 3A2), a second site (1B) which has a plurality of second host computers (3B1, 3B2) and a second storage device (2B) that respectively provides logical volumes to these respective second host computers (3B1, 3B2), a first intra-site network (CN3A) that connects the respective first host computers (3A1, 3A2) and the first storage device (2A) within the first site (1A) so that communications are possible, a second intra-site network (CN3B) that connects the respective second host computers (3B1, 3B2) and the second storage device (2B) within the second site (1B) so that communications are possible, a network (CN1) between storage devices that connects the first storage device (2A) and second storage device (2B) so that communications are possible, and a network (CN2) between host computers that connects the respective first host computers (3A1, 3A2) and the respective second host computers (3B1, 3B2) so that communications are possible.

Furthermore, in the present embodiment, a cluster control part (4) which forms the respective first and second host computers (3A1, 3A2, 3B1, 3B2) into a single cluster overall, a synchronizing part (see later embodiments) that synchronizes the logical volumes of the first storage device (2A) and the logical volumes of the second storage device (2B) via the network (CN1) between storage devices, and a reference managing part (5) which manages reference designating information that is used to designate either the first storage device (2A) or second storage device (2B) as the storage device that is to be used as a reference in cases where synchronization trouble occurs in the processing performed by the synchronizing part, are respectively disposed in the respective first host computers (3A1, 3A2) and respective second host computers (3B1, 3B2).

In cases where the occurrence of synchronization trouble is detected, the reference managing part (5) updates the reference designating information, and notifies the other site (1A or 1B) of this reference designating information. In cases where trouble that causes failover to occur is generated, the cluster control part (4) performs failover processing on the basis of the reference designating information.

The above is an outline of the overall construction of the present embodiment. To describe the constructions of the respective parts in greater detail, the site 1A and site 1B are installed in physically separate locations, such as a certain city and some other city, a certain building and some other building within the same area, or the like. Here, for example, the site 1A is a currently used site that provides an information processing service to a plurality of client machines not shown in the figures, and the site 1B is a standby site that provides backup in cases where some unexpected incident occurs in the site 1A.

A plurality of host computers and one or more storage devices are respectively installed in the respective sites 1A and 1B. For example, the storage devices 2A and 2B are constructed as large capacity external storage device systems such as disk array subsystems or the like. The storage devices 2A and 2B provide logical volumes to the respective host computers.

For example, the host computers 3A1, 3A2, 3B1 and 3B2 (hereafter referred to collectively as the "host computers" 3) are constructed as server machines. The host computers 3 access their own assigned logical volumes, and perform the reading and writing of data. Furthermore, the host computers 3 form a cluster.

Under ordinary conditions, as is shown in the upper part of FIG. 1, an information processing service is provided to the client machines from the respective host computers 3A1 and 3A2 of the site 1A. In an ordinary state prior to the occurrence of synchronization trouble (remote copying trouble), a "normal" state is set in the reference designating information.

For example, as is shown in the lower part of FIG. 1, a case will be considered in which trouble has occurred in the synchronization processing via the network CN1 between the storage devices as a result of cable breakage, link trouble or the like. In this case, the data that is written into the storage device 2A of the site 1A cannot be transferred to the storage device 2B of the site 1B. In the site 1A, even after synchronization trouble has occurred, one or both of the host computers 3A1 and 3A2 access the storage device 2A in accordance with requests from the client machines, and continue to update the data. Difference data 6 accumulates in the storage device 2A of the site 1A. The difference data 6 comprises data groups that are generated between the two logical volumes that form a copying pair; this data is generated and accumulated inside the copying source storage device 2A.

When the occurrence of synchronization trouble is detected, the reference designating information is altered from a "normal" state to a "first site (1A)" state. The "first site" state indicates that the site that holds the most recent data is the first site 1A. In cases where the function of the host computer 3A1 is stopped prior to the recovery from the synchronization trouble, failover processing is performed. The host computers 3 decide whether or not to perform failover processing on the basis of whether or not the storage devices that can be used by the host computers are holding the most recent data.

In the example shown in FIG. 1, the most recent data is held in the storage device 2A. Accordingly, the host computer 3A2 that can utilize this storage device 2A performs failover processing. Since the host computers 3B1 and 3B2 of the second site 1B cannot utilize the storage device 2A indicated in the reference designating information, these host computers do not perform failover processing. As a result, the initiation of erroneous operation based on old data following the occurrence of synchronization trouble can be prevented, so that the reliability of the storage system can be improved. Furthermore, even in cases where there are a plurality of host computers that are candidates for the failover destination, an appropriate failover destination computer can be selected on the basis of whether or not the most recent data can be accessed. As a result, failover processing can be automatically performed by an appropriate host computer without clear instructions from the system manager, so that the convenience of the system is improved. The present embodiments of the invention will be described in greater detail below.

1. First Embodiment

FIG. 2 is a block diagram which shows an overall outline of the storage system. For example, this storage system comprises a first site 10A and a second site 10B, and the respective sites 10A and 10B are connected by communications networks CN12 and CN13. Furthermore, as will be clear from the following embodiments as well, the storage system may also be constructed from three or more sites.

For example, the first site 10A and second site 10B may be located in different cities. Furthermore, the first site 10A and second site 10B may also be located at different geographical points in the same administrative region. Furthermore, for example, the first site 10A and second site 10B may also be located in respectively different buildings within the same construction complex.

The first site 10A and second site 10B have basically the same structure. As long as a function as a disaster recovery system can be manifested, the two sites 10A and 10B may also have different constructions. As one example, the first site 10A is a currently used site (operating site) that provides an information processing service to client machines not shown in the figures. The second site 10B is a backup site (standby site) that provides backup in cases where trouble occurs in the first site 10A.

Of course, it is not necessary that each site as whole be used as either an operating site or standby site; either an operating site or a standby site can be respectively set for each application program that provides an information processing service. For example, the operating site of a first application program may be taken as the first site 10A, and the operating site of a second application program may be taken as the second site 10B.

The first site 10A comprises a plurality of host computers HA1, HAn, and a storage device system 20A. As will be described later with reference to FIG. 3, the respective host computers HA1, HAn are constructed as server machines that use microcomputers. The respective host computers HA1, HAn each comprise a data freshness ensuring module 30, cluster software 40, and a remote copying control module 50. Details of these respective software items 30, 40 and 50 will be describe later with reference to FIG. 4.

For example, the storage device system 20A can be constructed as a disk array subsystem. As will be described later, the storage device system 20A comprises a plurality of logical volumes 212, and these logical volumes 212 are utilized by the host computers HA1, HAn.

The respective host computers HA1, HAn are connected to the storage device system 20A via an intra-site communications network CN11. For example, this communications network CN11 is constructed as a SAN (storage area network), and data communications are performed according to a fiber channel protocol.

The respective host computers HA1, HAn are respectively connected [to each other] via a communications network CN12 that connects the host computers to each other. Furthermore, he respective host computers HA1, HAn of the first site 10A are also mutually connected with the respective host computers HB1, HBn of the second site 10B via the communications network CN12. For example, this communications network CN12 between the host computers is constructed as a network such as the internet, a LAN (local area network), WAN (wide area network), MAN (metropolitan area network) or the like, and data communications are performed according to a TCP/IP (transmission control protocol/internet protocol).

Like the abovementioned first site 10A, the second site 10B also comprises a plurality of host computers HB1, HBn, and a storage device system 20B. The constructions of these parts are the same as those described in the first site 10A; accordingly, a description of these parts is omitted.

Here, the storage device system 20A and storage device system 20B are directly connected by means of a remote copying line CN13 used as a network between storage devices. For example, the remote copying line CN13 is constructed from a dedicated line or a public circuit.

Furthermore, the intra-site network CN11 is not limited to a construction using a fiber channel protocol (SCSI: small computer system interface); for example, a construction in which SCSI commands are packaged in IP packets, and data transfer at the block level is performed by an IP net, as in iSCSI, may also be used.

Figure 3:
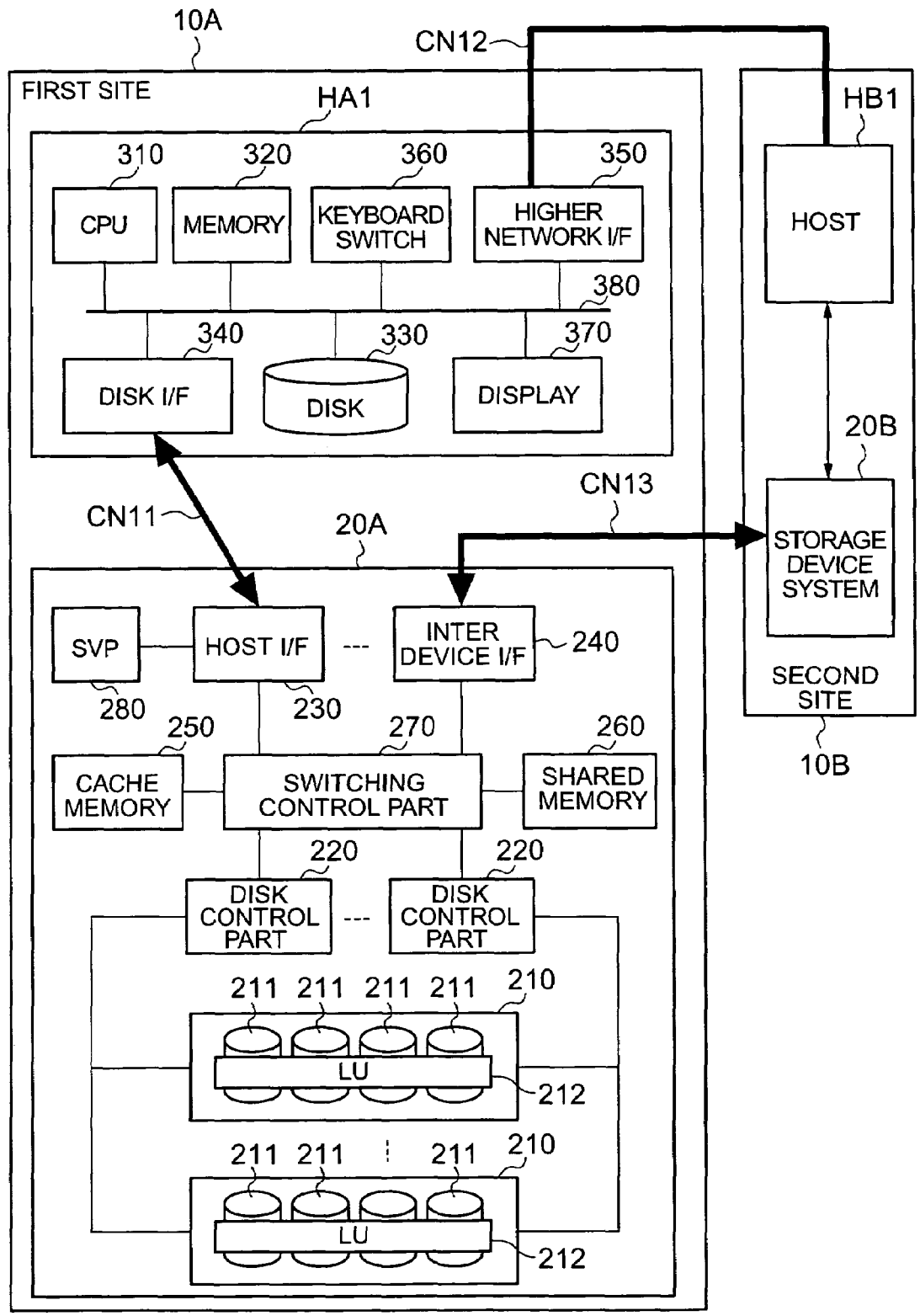
FIG. 3 is a block diagram which shows the hardware construction of a site.

FIG. 3 is a schematic block diagram which focuses on the hardware construction of the sites. In FIG. 3, the description will be centered on the first site 10A; however, the second site 10B also has a similar hardware construction.

Since the host computers HA1, HAn have basically the same structure, the construction of these computers will be described using the host computer HA1 as an example. Furthermore, in the following description, in cases where no particular distinction is made among the respective host computers, these host computers will be indicated as "host computers H" or "host computer H(number)".

For example, the host computer HA1 comprises a CPU 310, a memory 320, a disk 330, a disk interface (hereafter abbreviated to "I/F") 340, a higher network I/F 350, a keyboard switch 360 and a display 370. These respective parts are connected to each other by a bus 830.

The CPU (central processing unit) 310 reads in and executes a program code that is stored in the memory 320. By executing a specified program code, the CPU 310 causes various types of processing or functions such as cluster control, remote copying control and the like to be realized in the host computer HA1.

For example, the memory 320 is constructed from a ROM (read only memory), RAM (random access memory) or the like. In the figures, no distinction is made between ROM and RAM; in actuality, however, a ROM that stores the program code and the like, and a RAM that is used as a temporary memory region, working region or the like, are installed. For example, the disk 330 is constructed as a hard disk drive. For instance, programs and data are stored on the disk 330. Furthermore, there may also be cases in which a portion of the memory region of the disk 330 is used for the temporary storage of files.

The disk I/F 340 is a circuit that controls the exchange of data with the storage device system 20A via the intra-site network CN11. For example, the disk I/F 340 controls data transfer at the block level on the basis of SCSI or iSCSI. The higher network I/F 350 is a circuit that controls the exchange of data with other host computers (HAn, HB1 through HBn) via the network CN12 between host computers. For example, the higher network I/F 350 controls data transfer on the basis of the IP (internet protocol).

The keyboard switch 360 is one example of an information input means; the system manger can input necessary instructions and the like via the keyboard switch 360. The display 370 is one example of the information output means; for example, this display is constructed from a CRT (cathode ray tube) display, liquid crystal display, plasma display, EL (electronic luminescent) display or the like. Various types of information are displayed on the display 370, either automatically or in accordance with display requests from the system manager. Furthermore, the present invention is not limited to these parts; it would also be possible to use a voice input device, voice output device, pointing device, printer or the like.

Next, the hardware construction of the storage device system 20A will be described. For example, the storage device system 20A is constructed so that this system comprises a RAID group 210, a disk control part 220, a host I/F 230, an inter-device I/F 240, a cache memory 250, a share memory 260, a switching control part 270 and a service processor (SVP) 280.

The RAID (redundant array of independent disks) group 210 contains a plurality of disk drives 211, and provides redundant memory based on RAID such as RAID1, RAID5 or the like. For example, the respective disk drives can be constructed from hard disk drives, semiconductor storage devices, optical disk drives, optical-magnetic disk drives or the like. One or more logical volumes 212 constituting logical memory regions can be set in the physical memory regions provided by the respective disk drives 211. Large quantities of data that are utilized by the host computers H are stored in the logical volumes 212. Furthermore, control information and the like can be stored in other logical volumes 212, so that these logical volumes can also be utilized as system regions. Moreover, it is not necessary that all of the disk drives 211 be positioned inside the housing of the storage device system 20A. For example, logical volumes possessed by other storage device systems (not shown in the figures) disposed in the same site can be used as logical volumes of the storage device system 20A. In the following description, "logical volumes" may be abbreviated to "volumes" in some cases.

The disk control part 220 is a part that controls the exchange of data with other disk drives 211. For example, the disk control part 220 is constructed as a microcomputer system that contains a CPU and a ROM, RAM or the like. A plurality of disk control parts 220 are installed inside the storage device system 20A. For example, the disk control parts 220 perform data transfer at the block level on the basis of SCSI, iSCSI or the like.

The host I/F 230 is a part that controls data transfer with the host computers H via the intra-site network CN11. Like the disk control part 220, the host I/F 230 can be constructed as a microcomputer system. Host I/Fs 230 can be respectively prepared in accordance with the type of the host computers H (server, main frame, or the like). Furthermore, in the present embodiment, a case in which the host computers H are constructed as servers is described as an example; however, these host computers H may also be main frame computers.

The inter-device I/F 240 is a part that performs data communications with the storage device system 20B of the other site 10B via the remote copying line CN13. The inter-device I/F 240 transfers updated data and difference data written into the logical volumes 212 to the other storage device system 20B without the intermediaryship of the host computers H.

Here, to give a brief description of remote copying, logical volumes that constitute the object of synchronization are selected beforehand from the plurality of logical volumes 212 belonging to the storage device system 20A and the plurality of logical volumes belonging to the storage device system 20B. In these selected pairs of logical volumes 212, one logical volume is the copying source volume, while the other logical volume is the copying destination volume. The data (updated data) that is written into the copying source volume from the host computers H is transferred to the copying destination volume via the remote copying line CN13 from the inter-device I/F 240, and is written into the copying destination volume.

Furthermore, when remote copying is stopped, the data that is written into the copying source volume is managed as difference data. For example, the difference data can be managed using a difference bit map table or the like. When remote copying is restarted, the difference data is first transferred to the copying destination volume from the copying source volume, so that re-synchronization of the respective volumes is performed.

For example, the cache memory 250 can be constructed from a volatile or nonvolatile semiconductor memory. The cache memory 250 stores write data from the host computers H. Furthermore, the cache memory 250 stores read data that is read out from the logical volumes 212. Here, for example, the data that is stored in the cache memory 250 can be classified as described below. One type of data is data in a state that is stored only in the cache memory 250, and is not written into the disk drives 211. Data in this state is called (for example) "dirty data". The other type of data is data in a state that is written into either the cache memory 250 or the disk drives 211. For example, data in this state is called "clean data".

For example, the shared memory 260 can be constructed from a nonvolatile or volatile semiconductor memory. The shared memory 260 stores various types of commands received from the host computers H and control information and the like that is used in the control of the storage device system 20A. Such commands, control information and the like are redundantly stored by a plurality of shared memories 260. Furthermore, the cache memory 250 and shared memory 260 can be constructed as respectively separate memories, or a part of one memory can be used as a cache memory region, while the remaining part of this memory is used as a shared memory region.

The switching control part 270 is a part that mutually connects the respective disk control parts 220, the respective host I/Fs 230, the inter-device I/F 240, the cache memory 250 and the shared memory 260. For example, the switching control part can be constructed from an ultra-high-speed cross-bar switch or the like.

The SVP 280 collects and monitors the states of the respective parts inside the storage device system 20A via the host I/F 230. The SVP 280 outputs the collected internal state information to an external management terminal (not shown in the figures) as raw data or as data that has been subjected to statistical processing. Examples of information that can be collected by the SVP 280 include device construction, power supply alarm, temperature alarm, input-output speed (IOPS) and the like. The system manager can perform setting alterations of the RAID construction and opening and closing processing of various types of packages (host I/F, disk control part and the like) from the management terminal via the SVP 280.

Next, the operation of the storage device system 20A will be described. The host I/F 230 receives write commands and write data from the host computers H via the intra-site network CN11. The received write commands are stored in the shared memory 260, and the received write data is stored in the cache memory 250. The disk control part 220 occasionally refers to the shared memory 260. When the disk control part 220 discovers an unprocessed write command stored in the shared memory 260, the disk control part 220 reads out the write data from the cache memory 250 in accordance with this write command, and performs an address conversion and the like. The disk control part 220 stores the write data in the respective disk drives constituting the logical volume 212 designated by the write command.

In cases where the logical volume 212 into which data is written from the host computers H is set as a copying source volume, this write data is transferred to the storage device system 20B that has the copying destination volume via the remote copying line CN13 from the inter-device I/F 240. When the storage device system 20B that is the transfer destination receives the write data via the inter-device I/F, this write data is stored in the cache memory, and the completion of writing is reported to the transfer source storage device system 20A. After reporting the completion of writing, the transfer destination storage device system 20B writes the write data into the copying destination volume at an appropriate timing.

After confirming that the completion of writing has been reported from the transfer destination storage device system 20B, the host I/F230 of the transfer source storage device system 20A reports the completion of writing to the host computer H. A method in which the completion of writing is thus reported to the host computer H after waiting for a report of the completion of writing from the transfer destination storage device system 20B is called synchronous remote copying.

On the other hand, a method in which the completion of writing is reported to the host computer H at the point in time at which the transfer destination storage device system 20A stores the write data from the host computer H in the cache memory 250 is called asynchronous remote copying. In the case of synchronous remote copying, the processing time is increased by an amount corresponding to the waiting time for a response from the transfer destination. However, since the completion of writing is reported to the host computer H after it has been confirmed that transfer has been normally completed, it can be ensured that the copying source volume and copying destination volume are synchronized. In the case of asynchronous remote copying, since the completion of writing is reported to the host computer H prior to the transfer of the write data to the other storage device system 20B, the response time can be shortened; however, since no check is made as to whether or not the memory content of the copying source volume has been updated, it cannot be reliably ensured that remote copying has been completed in a normal manner.

Thus, two methods of remote copying, i. e., synchronous remote copying and asynchronous remote copying, are known. These respective systems have technical properties that originate in their respective constructions. The reliability of synchronous remote copying and the high speed characteristics of asynchronous remote copying can be used as necessary, with the physical distance between the sites and the response characteristics and the like that are required being taken into account.

For example, in cases where the distance between the operating site 10A and standby site 10B is a relatively short distance such as a few tens of kilometers or less, even if synchronous remote copying is used, there tends not to be an effect on the propagation delay or response time. In the present embodiment, synchronous remote copying is describe as an example. However, as will be clear from the following embodiments as well, the present invention can also use asynchronous remote copying.

Next, a case in which a read request from a host computer H is processed will be described. When the host I/F 230 receives a read command from a host computer H, this read command is stored in the shared memory 260. When the disk control part 220 discovers an unprocessed read command in the shared memory 260, the disk control part 220 reads out the data from the respective disk drives 211 constituting the logical volume 212 designated by this read command. The disk control part 220 stores the read-out data in the cache memory 250. Furthermore, the disk control part 220 notifies the host I/F 230 (via the shared memory 260) that the reading of the requested data has been completed. The host I/F 230 reads in the data from the cache memory 250, and transmits this data to the host computer H.

Figure 4:
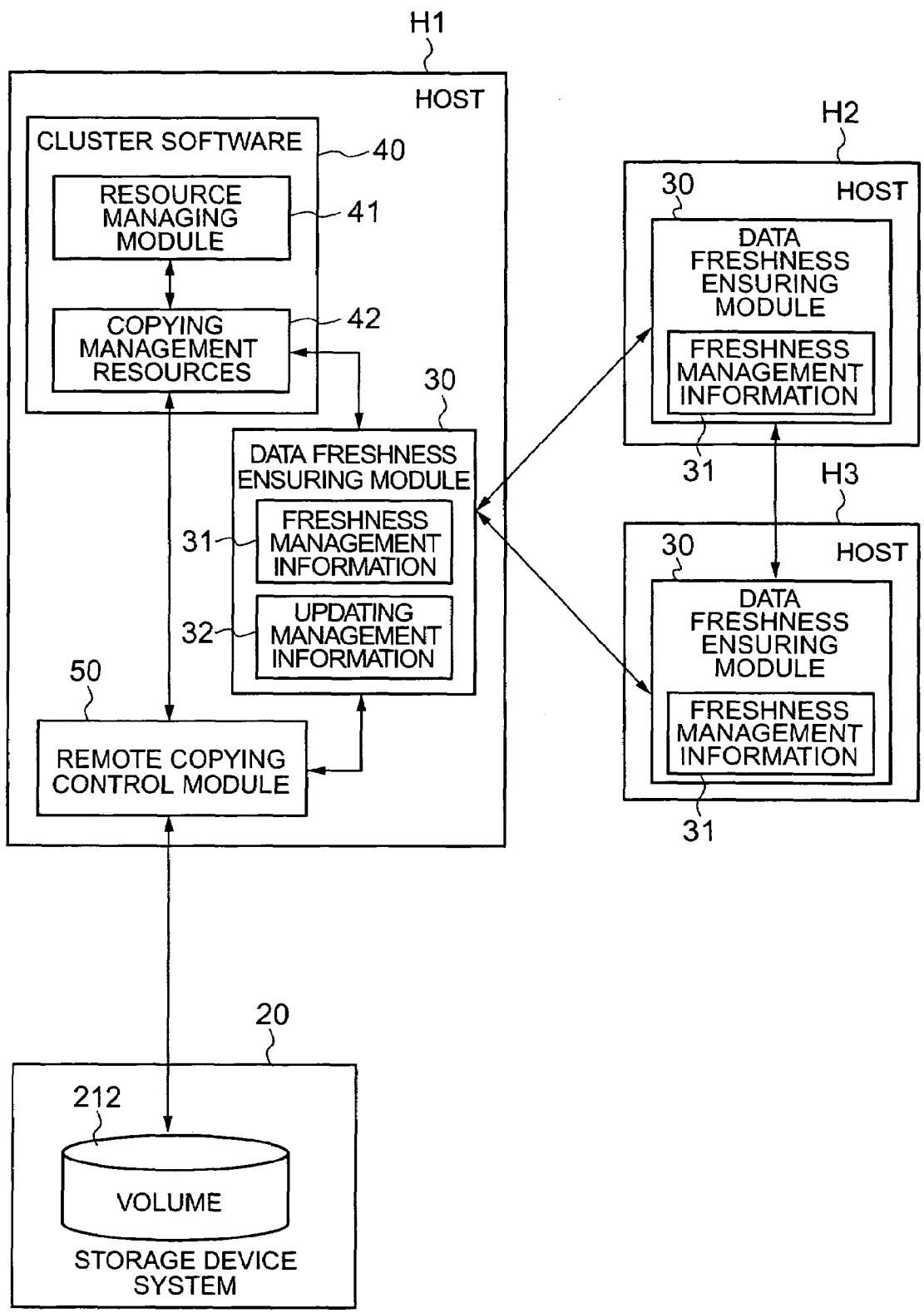
FIG. 4 is a block diagram which shows the software construction of a host computer.

FIG. 4 is block diagram which shows the software construction of the host computer H in model form. For example, [each] host computer H comprises an OS (operating system), various types of device drivers and the like. In addition, as is shown in FIG. 4, each host computer H comprises a data freshness ensuring module (hereafter also referred to as an "ensuring module") 30, cluster software 40, and a remote copying control module 50.

Furthermore, in FIG. 4, a scheme is shown in which it appears as though the respective software items 30, 40 and 50 are installed only in the host computer H1; in actuality, however, the respective software items 30, 40 and 50 are mounted in all of the host computers H1, H2 and H3 that form the cluster system. Furthermore, the respective functions that are to be realized by the respective software items 30, 40 and 50 need not be constructed from program codes or data; for example, some or all of these functions may be constructed from hardware circuits.

The ensuring module 30 is a software [module] that is used to manage the question of which site has the volume storing the most recent data, and has a communications function for performing communications with the other ensuring modules 30.

For example, the ensuring module 30 can respectively manage freshness management information 31 and updating management information 32. As will be described later with reference to FIG. 6, freshness management data indicating the volumes of the site storing the most recent data is stored for each copying pair. Furthermore, the freshness management information is also called "data freshness management information". The freshness management information 31 corresponds to the "reference designating information".

The updating management information 32 manages the question of whether or not all of the other host computers H have been notified of the freshness management information 31. In other words, the updating management information 32 is information that is used to manage the state of notification of the freshness management information 31 to the respective host computers H. This will be described in greater detail later; however, in cases where trouble occurs in remote copying, the ensuring module 30 updates the updating management information 32, and respectively notifies the other host computers H.

Specifically, in cases where remote copying trouble occurs, the ensuring module 30 judges the volume that is to act as a reference (the volume storing the most recent data), and respectively notifies the other host computers H. For example, this notification can be realized by respectively transmitting specified information to all of the other ensuring modules 30 from the ensuring module 30 that detected the occurrence of trouble in remote copying. Furthermore, for example, notification can also be repeated a specified number of times.

The cluster software 40 is software that controls the cluster system. The respective host computers H (nodes) of the respective sites 10A and 10B from a single cluster overall as a result of the cooperation of the respective cluster software [units] 40. For example, each cluster software [unit] 40 can monitor whether or not the function of the host computer H that is the object of monitoring has stopped, by performing heartbeat communications.

Furthermore, the cluster software 40 comprises various types of modules that are used to control the cluster. For example, the resource management module 41 and copying management resources 42 can be cited as modules that relate to the present invention.

The resource management module 41 is a module that manages the resources that are used in the cluster as a part of the cluster control. For instance, the respective logical volumes and the network settings of the host computers H and the like may be cited as examples of resources.

The copying management resources are resources that register the set remote copying pairs as resources of the cluster, and manage remote copying. The copying management resources receive instructions relating to the operation of the copying pair, and alter the volume settings. Furthermore, the copying management resources 42 can also periodically check the state of the volumes that form the copying pair. Moreover, in cases where remote copying trouble occurs, the copying management resources 42 can also query the ensuring module 30 as to whether or not the volumes are usable.

The remote copying control module 50 controls the operation of remote copying. For example, on the basis of instructions from the copying management resources 42, the remote copying control module performs operations such as the formation of copying pairs, division of copying pairs, checking of the state of copying pairs, and reversal of copying pairs. The respective states of the copying pairs will be further described later. Furthermore, in the following description, "copying pairs" may be abbreviated to "pairs" in some cases.

Next, the failover execution method will be briefly described. As one method, when one of the host computers H stops functioning, the heartbeat communications with this host computer H are interrupted, so that the stopping of the functioning of this host computer H is detected. The cluster software 40 of the host computer H selected as the failover destination takes over the resources such as volumes, network setting information and the like that were used by the failover source host computer H. The failover destination host computer H restarts the information processing service (business service) that was provided by the failover source. The client machines that utilize the information processing service of the host computer H are not particularly conscious of the changeover from the operating host computer H to the standby host computer H.

Separately from such a processing method, a different method can be executed (for example) in cases where a planned stop is made, cases where the operating host computer H partially stops functioning, or cases where the operating host computer H is temporarily placed in an overloaded state. Specifically, the operating host computer H constituting the failover source explicitly requests the restarting of failover processing from the host computer selected as the failover destination. The host computer H receiving this failover processing start request takes over the resources such as the network setting information, volumes and the like, and starts the provision of the information processing service.

Figure 5:
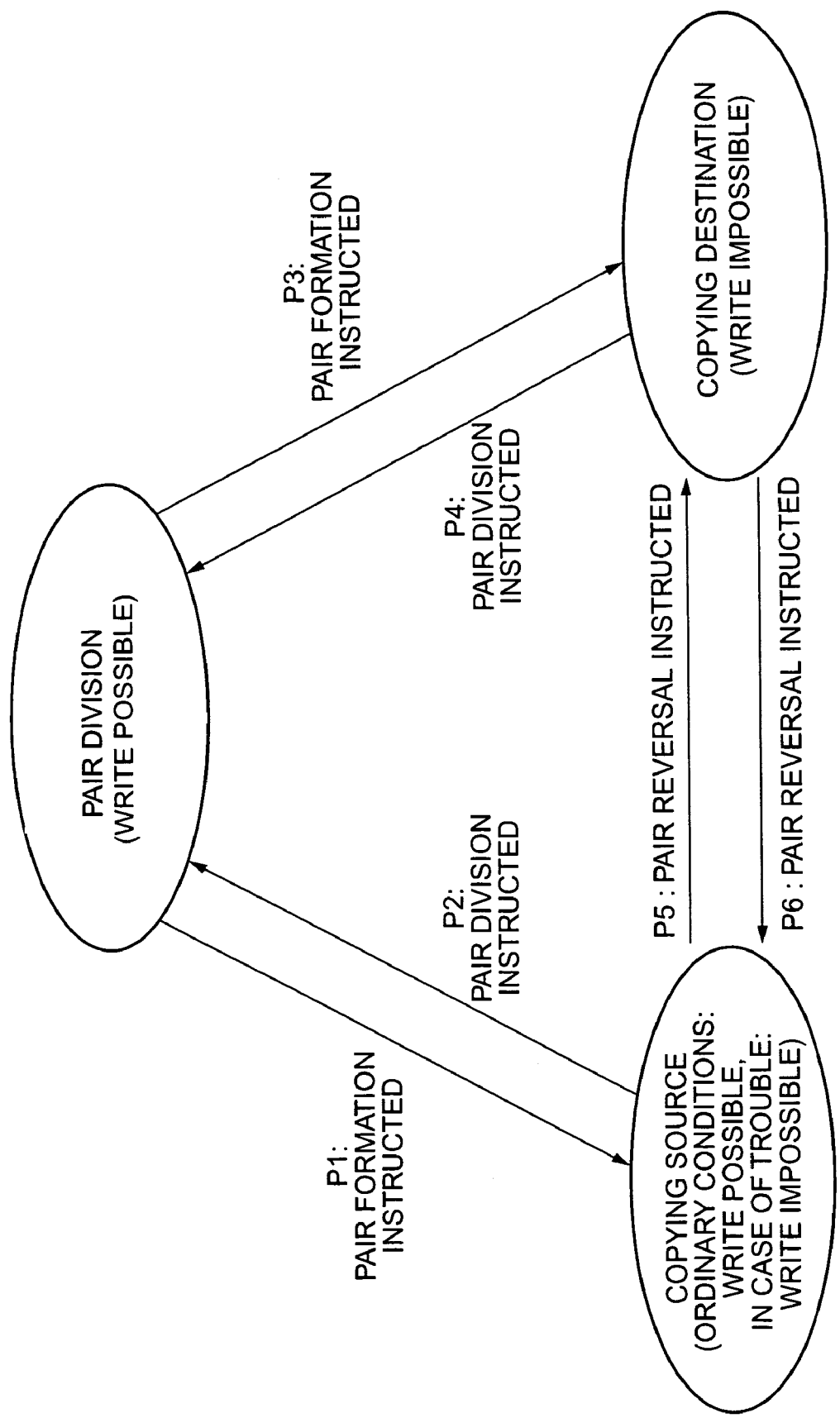
FIG. 5 is an explanatory diagram which shows the pair state that can be assumed by the copying pair, and the transition of the respective pair states.

FIG. 5 is a state transition diagram which shows in model form the respective types of pair states that can be adopted by the volumes, and the transitions between these respective pair states. As is shown in FIG. 5, for example, three types of states, i. e., "pair division state", "copying source state" and "copying destination state", can be cited as pair states of the volumes that are the object of remote copying.

The "pair division state" indicates a state that is not the object of remote copying. In the case of volumes in the "pair division state", the host computers H that are connected to these volumes can accomplish both read access and write access. Here, for example, in the case of the "pair division state", difference data generated following pair division can be separately managed by means of a bit map or the like. As a result, during the re-synchronization of the copying pair, it is necessary to transfer only the difference data to the copying destination volume, so that the time required for re-synchronization can be shortened. Alternatively, there is also a method in which the data stored by the copying source volume is transferred as a whole to the copying destination volume so that a pair state is reconstructed in cases where the copying pair is re-synchronized after once being divided.

The "copying source state" is the state that is set for the copying source volume. In the case of a volume that is in the "copying source state", the host computers H that are connected to this volume are capable of both read access and write access. When the memory contents of a volume that is set in the "copying source state" are updated, the memory contents of volumes that are set in a "copying destination state" are also updated in synchronization with the above-mentioned updating. Furthermore, in cases where some type of trouble occurs in remote copying, it becomes impossible to alter the memory contents of the copying destination volume in accordance with the alteration of the memory contents of the copying source volume. Specifically, in the case of remote copying trouble, even if write access to the copying source volume is permitted, write data cannot be written into the copying destination volume. Accordingly, in cases where trouble occurs in remote copying, write access to volumes that are in a "copying source state" is prohibited. In this case, I/O requests (write access requests) from the host computers H to the copying source volume fail.

The term "copying destination state" refers to a state that forms a pair with the "copying source state", and that is set for the copying destination volume. The updating of volumes that are set in a "copying source state" is synchronously reflected in volumes that are set in a "copying destination state". In the case of a volume that is set in such as "copying destination state", write access from host computers H that are connected to this volume is impossible. Furthermore, read access to volumes that are set in a "copying destination state" may be permitted or prohibited.

Next, the transitions between the respective pair states will be described. Here, it is assumed that the initial state of the respective volumes that form the copying pair is the "pair division state". When a "pair formation instruction" is issued for one of the two volumes that are in a "pair division state" (P1), this volume changes from a "pair division state" to a "copying source state". This volume comprises the copying source volume. Furthermore, the other volume that forms a pair with this copying source volume changes from a "pair division state" to a "copying destination state" (P3).

In regard to the volume that is set in a "pair division state", in cases where a "pair division instruction" is issued from a host computer H that is connected to this volume (P2), the volume changes from a "copying source state" to a "pair division state". At substantially the same time, the volume that is set in a "copying destination state" also changes to a "pair division state". In regard to the volume that is set in a "pair destination state", in cases where a "pair division instruction" is issued from a host computer that is connected to this volume (P4), the same change as that described above is effected. Specifically, the volume that is in a "copying destination state" and the volume that is in a "copying source state" both change to a "pair division state".

The direction of remote copying is determined by the states in which the volumes are set. Write data is transferred from the volume that is set in a "copying source state" to the volume that is set in a "copying destination state". This direction of remote copying can be reversed by issuing a "pair reversal instruction".

In regard to the volume that is set in the "copying source state", when a "pair reversal instruction" is issued from a host computer H that is connected to this volume (P5), this volume changes from the "copying source state" to a "copying destination state". At the same time, the other volume changes from a "copying destination state" to a "copying source state". Similarly, in regard to the volume that is set in the "copying destination state", when a "pair reversal instruction" is issued from a host computer H that is connected to this volume (P6), the volume that is in this "copying destination state" changes to a "copying source state", and the volume that is in a "copying source state" changes to a "copying destination state".

FIG. 6 is an explanatory diagram which respectively shows the constructions of the freshness management information 31 and updating management information 32 that is manage by the ensuring module 30.

As is shown in the upper part of FIG. 6, the freshness management information 31 can be constructed by establishing a correspondence among the copying pair No. used to identify the respective copying pairs, the time at which the pair reference state was registered, and the pair reference state. Furthermore, the date may also be included in the registered time.

The pair reference state differs from the abovementioned pair state, and is information that designates the volume that is to be used as a reference. The "volume that is to be used as a reference" refers to the volume storing the most recent data among the volumes that constitute the pair. For instance, "normal state", "first site (operating site)" and "second site (standby site)" may be cited as examples of the pair reference state.

The "normal state" is a state that conforms to ordinary operation; accordingly, the copying source volume is the reference [in this state]. The "first site state" is a state which indicates that the volume installed in the first site 10A is the reference. The "second site state" is a state which indicates that the volume installed in the second site is the reference. Thus, the freshness management information 31 indicates the volume that is to be used as a reference for each remote copying pair. In cases where remote copying trouble occurs, the freshness management information 31 indicates the volume that is to be used as a reference by the name of the site in which this volume is installed.

Furthermore, in FIG. 6, the pair volume #1 is shown as being in the "normal state", the pair volume #2 is shown as being in the "first site state", and the pair volume #3 is shown as being in the "second site state"; however, these states are shown only for purposes of description.

As is shown in the lower part of FIG. 6, the updating management information can be constructed by (for example) establishing a correspondence among the copying pair No., the name of the host computer utilizing the pair volumes, and the updating result state that indicates the results of notification of the freshness management information.

For instance, "not-performed state", "successful state" and "failure state" can be cited as examples of the updating result state. Here, the "not-performed state" indicates the state before notification of the freshness management information 31 is sent to the host computer H. The "successful state" indicates a state in which notification of the freshness management information 31 has been successfully sent to the host computer H, and the freshness management information 31 has been updated in this host computer H. The "failure state" indicates a state in which the sending of notification of the freshness management information 31 to the host computer H ended in failure. Furthermore, "-" in the updating results indicates a state in which notification is unnecessary, since the host computer is the issuing source of the freshness management information 31.

Figure 7:
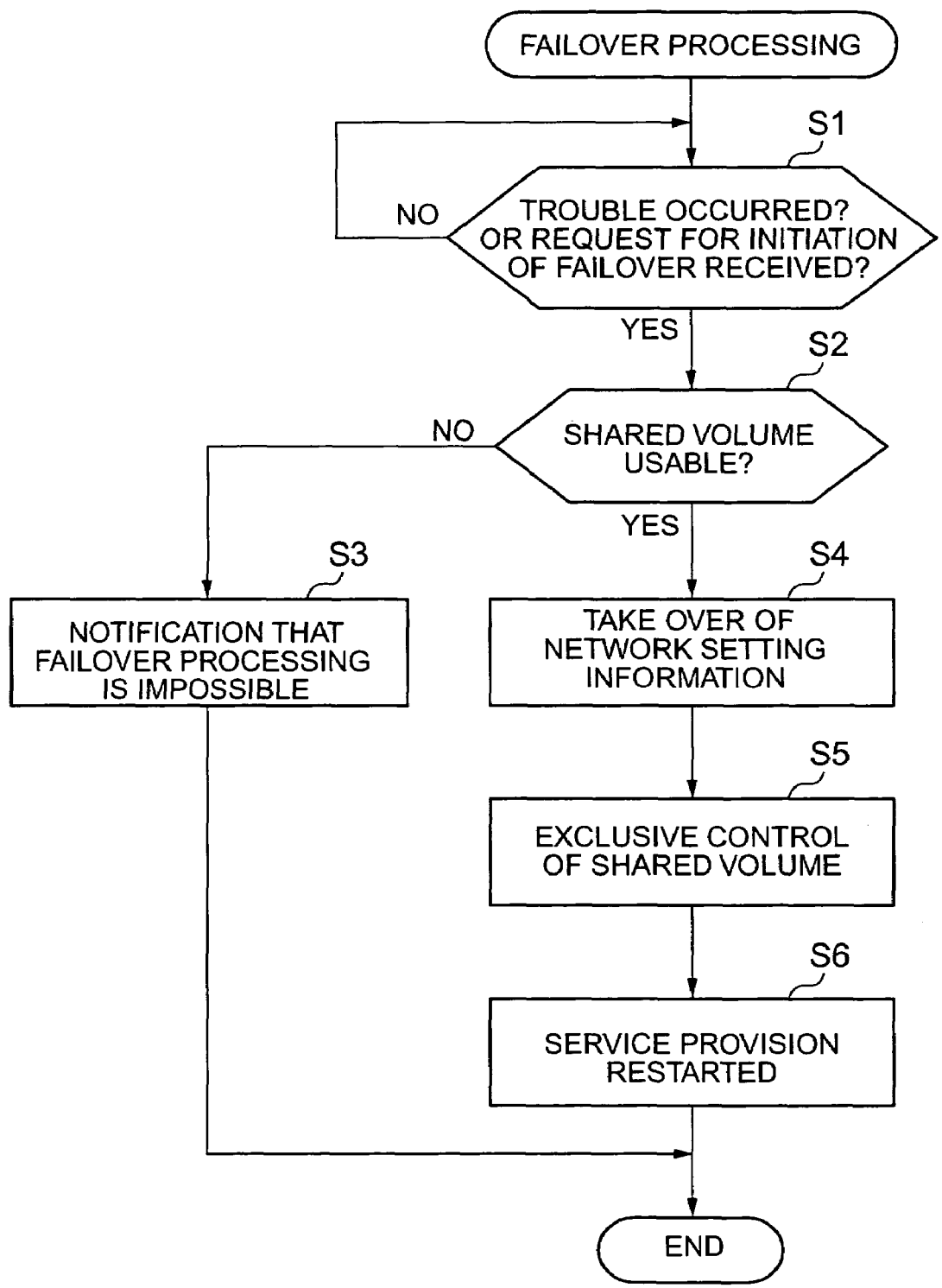
FIG. 7 is a flow chart of the failover processing.

FIG. 7 is a flow chart which shows an outline of the failover processing. Failover processing can be performed within the same site, or can be performed with another site.

The respective host computers H that form the cluster monitor whether or not trouble requiring the execution of failover has been detected, or whether or not a failover start request has been received, by means of the respective cluster software [units] 40 (S1).

In cases where trouble has occurred in the other host computer H, or in cases where a failover start request has been received from the other host computer H (S1: YES), a judgement is made as to whether or not the shared volumes (logical volumes) required for the execution of failover processing can be used (S2). These shared volumes form the remote copying pair. As will be described later, in cases where the pair operation of the shared volumes is possible, failover processing can be executed using these volumes. Furthermore, even in cases where the pair operation (pair state altering operation) of the shared volumes is not possible, failover processing can be executed using these volumes by processing of the data freshness ensuring module, in cases where such use is judged to be possible.

In cases where the shared volumes required for failover cannot be utilized (S2: NO), the cluster software 40 notifies the failover source host computer or all of the other host computers that the execution of failover processing is impossible (S3). Although this is not always necessary, the other host computers H that receive notification that processing is impossible can judge whether or not these host computers H themselves can perform failover processing.

In cases where the shared volumes that are required for failover can be utilized (S2: YES), the host computer H that constitutes the failover destination takes over network setting information such as IP addresses and the like from the host computer H that constitutes the failover source (S4), and acts as a substitute for the failover source host computer. Furthermore, the failover destination host computer H initiates the exclusive control of the shared volumes by issuing a reserve command or the like (S5). In addition, after the respective types of processing that are required to restart the business service are completed, the failover destination host computer H restarts the provision of the service to the client machines (S6).

For example, it is assumed that the host computer HA1 of the first site 10A is providing a business service, and that this host computer HA1 stops functioning. In cases where no trouble has occurred in remote copying, the memory contents of the copying source volume used by the host computer HA1 are synchronously reflected in the copying destination volume, so that the memory contents of both volumes match. Accordingly, if the host computer is a host computer that can utilize either the copying source volume or copying destination volume that is used in the provision of the business service, failover processing can be executed.

On the other hand, in cases where trouble occurs in remote copying prior to the initiation of failover processing, the memory contents of the copying source volume and copying destination volume used in the provision of the business service do not match. The memory contents of the two volumes differ, and the most recent data is accumulated as difference data on the side of the copying source volume. In this case, if failover processing is executed using a volume in which the most recent data is not reflected, matching of the data is lost, so that erroneous operation is performed. Accordingly, as will be described later, operation is restarted using the volume that stores the most recent data (of the two volumes that form the copying pair).

Figure 8:
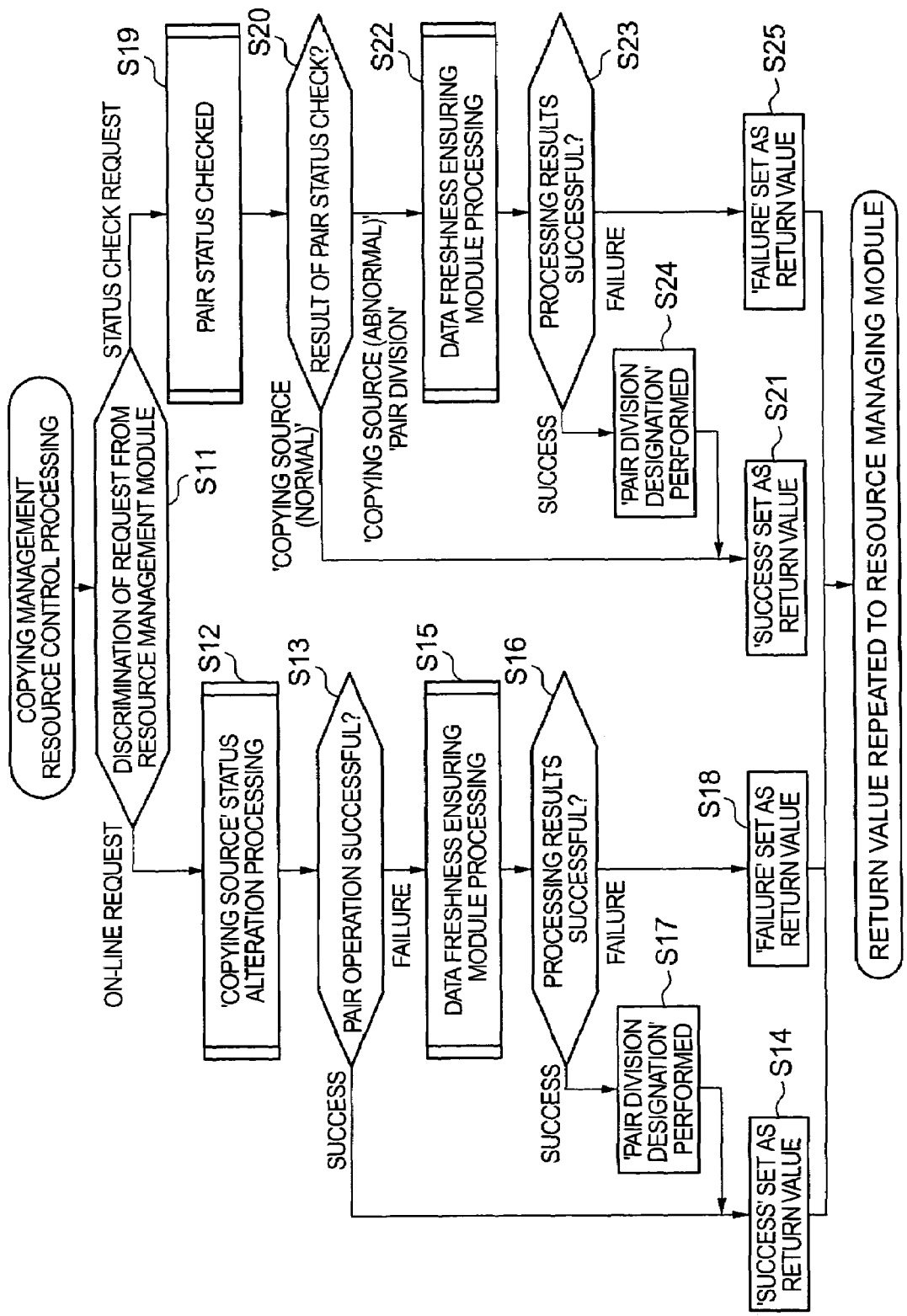
FIG. 8 is a flow chart of the copying management resource control processing.

FIG. 8 is a low chart which shows the control processing that is performed by the copying management resources 42. The processing shown in FIG. 8 is started when the copying management resources 42 receive a request from the resource managing module 41.

The copying management resources 42 make a judgement as to whether the request from the resource managing module 41 is an "on-line request" or a "state confirmation request" (S11). Here, the term "on-line request" refers to a request that is used to request initiation of the use of the volumes. The term "state confirmation request" refers to a request that is used to confirm the state of the volumes.

In cases where the resource managing module 41 issues an on-line request, an instruction is output to the remote copying control module 50 so that the host computer H that has this resource managing module 41 becomes the copying source, and the state of the volumes that are connected to this host computer H is altered to "copying source state" (S12). The processing of this alteration to copying source status (S12) will be described later with reference to FIG. 9.

Next, a judgement is made as to whether or not the alteration to a "copying source state" was successful (S13). In cases where the alteration to a "copying source state" was successful, "successful" is set as the return value to the resource managing module 41 (S14). In ordinary cases where no abnormality occurs, the judgement results of S13 will be "successful".

On the other hand, in cases where (for example) trouble such as link cutting or the like occurs in the remote copying line CN13, or in cases where an abnormality occurs in the remote copying function inside the storage device system, the state of the object volume cannot be altered to "copying source state".

In cases where the alteration to a "copying source state" fails, a query is sent to the ensuring module 30 in order to ascertain whether or not the volume for which a pair operation was attempted is usable, i. e., whether or not this volume is the volume storing the most recent data (S15). The details of this data freshness ensuring module processing will be described later with reference to FIG. 10.

The ensuring module 30 responds to the query from the copying management resources 42 with either "successful" or "failure". "Successful" means that the volume that failed in the alteration processing to a "copying source state" is storing the most recent data, and that failover processing or the like can be executed using this volume. "Failure" means that this volume does not store the most recent data, and that there is a possibility that erroneous operation will be performed if control processing such as failover processing or the like is executed using this volume.

In cases where the response from the ensuring module is "successful", a "pair division instruction" is issued (S17), and a response of "successful" is sent to the resource managing module 41 (S14). As was described with reference to FIG. 5, read access and write access to the volume can be accomplished by releasing the copying pair that is the object of operation.

In cases where the response from the ensuring module 30 is "failure", this is a case in which failover processing or the like cannot be performed using this volume; accordingly, a report of "failure" is made to the resource managing module 41 (S18).

The abovementioned S12 through S18 are steps that are used to process on-line requests from the resource managing module 41. Next, the processing (S19 through S25) that is performed in cases where the resource managing module 41 requests a confirmation of status will be described.

The resource managing module 41 periodically checks the state of the volumes. When the copying management resources 42 receive a status confirmation request from the resource managing module 41, the state of the copying pair is confirmed via the remote copying control module 50 (S19).

The pair state confirmation results (S20) can be divided into two types. One type indicates a case in which the pair state of the volumes is ""copying source state (normal)", while the other type indicates a case in which the pair state of the volumes is either "copying source state (abnormal)" or "pair division state". "Copying source state (normal)" indicates that the volume is set as the copying source, and that the volume can be used in a normal manner without any abnormalities. "Copying source state (abnormal)" indicates that the volume is set as the copying source, but that some type of abnormality (remote copying trouble) has occurred.

In cases where the pair state is "copying source state (normal)", a report of "successful" is sent to the resource managing module 41 (S21). In cases where the pair state is either "copying source state (abnormal)" or "pair division state", a query is sent to the ensuring module 30 as to whether or not the volume is usable (S22).

As was also described in the description of S15, a case in which the response from the ensuring module 30 is "successful" is a case in which the volume can be used; accordingly, a "pair division instruction" is issued (S24), and a report of "successful" is made to the resource managing module 41 (S21). Furthermore, the "pair division instruction" may be issued automatically, or may be issued manually by the system manager. On the other hand, in cases where the response from the ensuring module 30 is "failure", "failure" is reported to the resource managing module 41 (S25).

Thus, in cases where no trouble has occurred, the copying management resources 42 make a report of "successful" with respect to both on-line requests and status confirmation requests from the resource managing module 41. On the other hand, for example, in cases where remote copying control cannot be performed in a normal manner because of link cutting, an abnormality in the storage device system or the like, "failure" is reported to the resource managing module 41 by the copying management resources 42.

Figure 9:
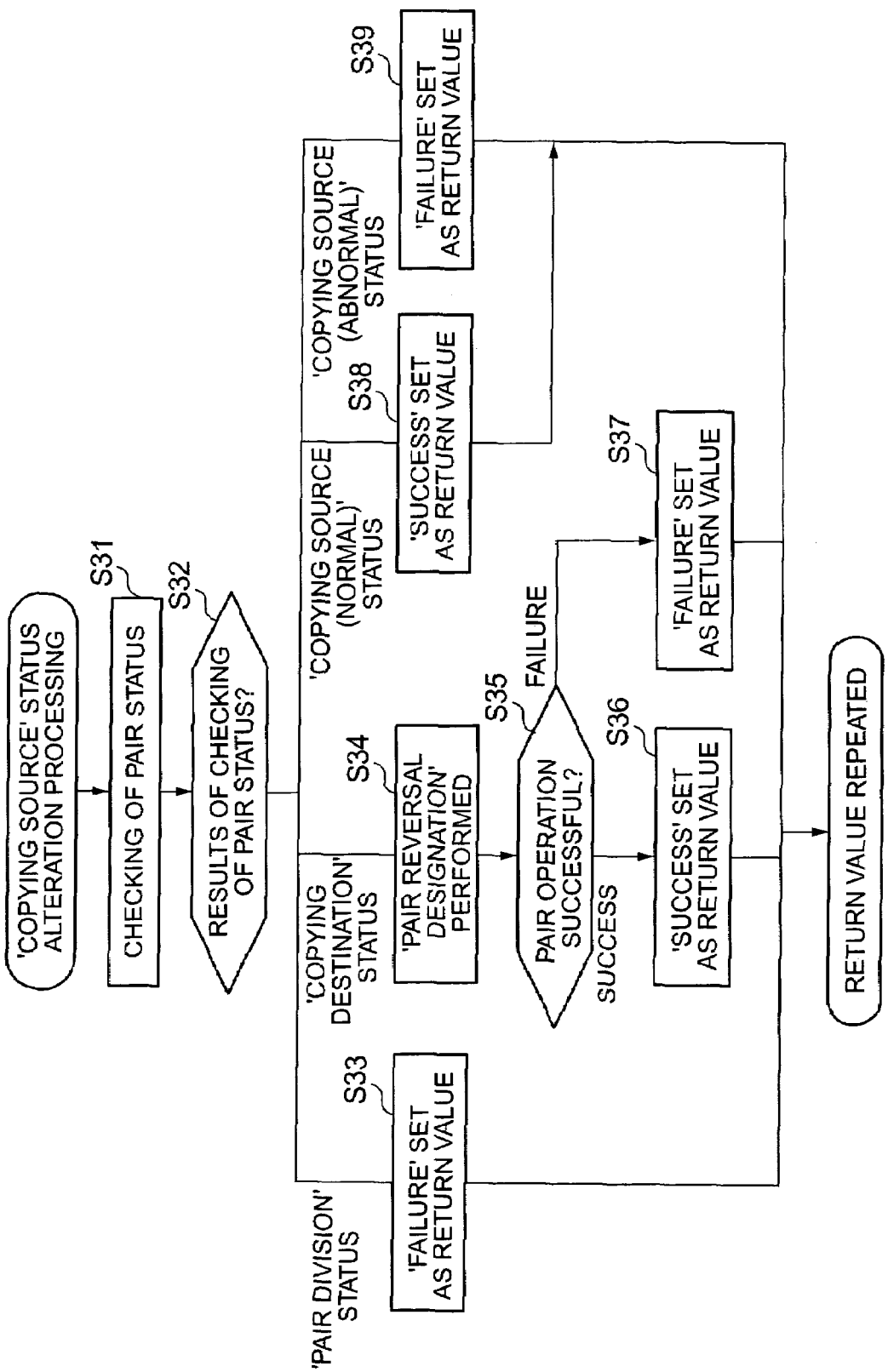
FIG. 9 is a flow chart of the copying source status alteration processing.

FIG. 9 is a flow chart showing the details of the "copying source status alteration processing" shown in S12 in FIG. 8. the copying management resources 42 check the current pair state of the volumes for which an alteration of the pair state has been requested (S31).

Then, the subsequent processing is performed in accordance with the confirmation results of the current pair state (S32). In cases where the current pair state is "pair division state", "failure" is set as the return value (S33). In cases where the current pair state is "copying destination state", a "pair reversal instruction" to alter the setting to "copying source state" is executed (S34). A judgement is made as to whether or not the pair reversal instruction was successful (S35), and in cases where the pair reversal was successful, "successful" is set as the return value (S36). In cases where the pair reversal failed, "failure" is set as the return value (S37).

In cases where the current pair state is "copying source state (normal)", "successful" is set as the return value (S38). In cases where the current pair state is "copying source state (abnormal)", "failure" is set as the return value (S39).

Figure 10:
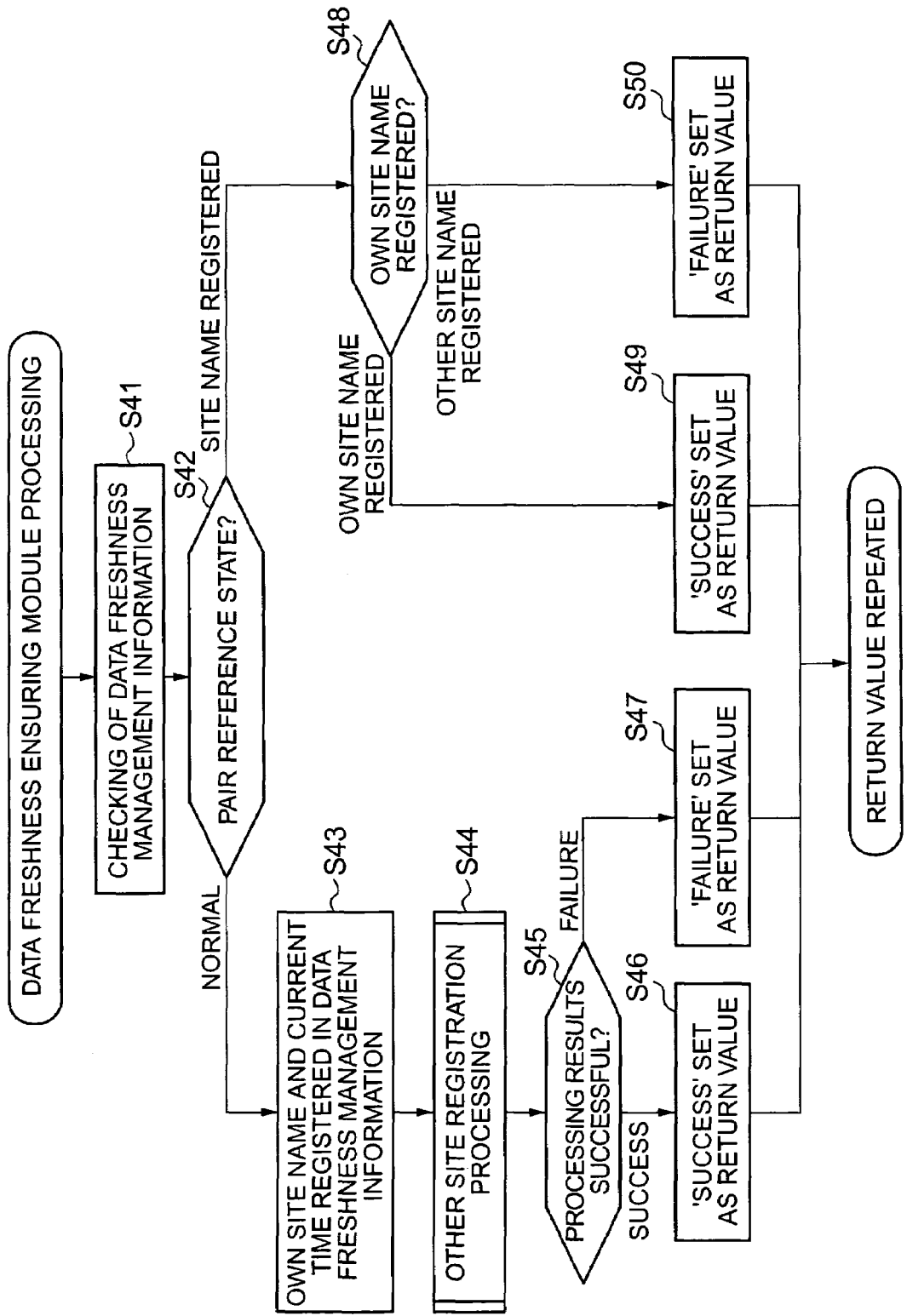
FIG. 10 is a flow chart of the data freshness ensuring module processing.

FIG. 10 is a flow chart that shows the details of the "data freshness ensuring module processing" shown in S15 and S22 in FIG. 8. As will be described below, the ensuring module 30 makes a judgement as to whether or not the desired volumes are usable in response to a request from the copying management resources 42. Here, as was described with reference to FIG. 8, in cases where the pair state operation for the desired volumes fails, the ensuring module 30 receives a query from the copying management resources 42. Cases in which there is a failure in the operation of the pair state are cases in which the states of the volumes forming the copying pair cannot be altered, i.e., cases in which trouble has occurred in at least the execution of the remote copying function, because of (for example) trouble in the remote copying line CN13, trouble inside the storage device system or the like.

Thus, the processing shown in FIG. 10 is performed in cases where remote copying trouble has occurred inside the storage system. First, when the ensuring module 30 receives a query from the copying management resources 42 as to whether or not the volume is usable, the ensuring module 30 checks the freshness management information 31 (S41).

The ensuring module 30 checks the pair reference state of the queried volume S42). As was described above, the "pair reference state" refers to information that is used to specify the volume that is to be used as a reference in cases where remote copying trouble occurs; three types of these states are provided: i.e., "normal state", "first site state" and "second site state". Cases in which the "normal state" is set indicate a normal state, while cases in which the site name is registered as in the "first site state" and "second site state" indicate an abnormal state.

In cases where the pair reference state that is currently set in the freshness management information 31 is the "normal state", the volume's own site name is registered as the pair reference state, and the current time is registered (S43). In cases where the processing shown in FIG. 10 is executed by any of the host computers HA1 through HAn belonging to the first site 10A, the "first site state" is set as the pair reference state of the respective volumes that are connected to these respective host computers HA. Conversely, in cases where the abovementioned processing is performed by any of the host computer HB1 through HBn belonging to the second site 10B, "second site state" is set as the pair reference state of the volumes that are respectively connected to these respective host computers HB. In other words, in cases where the pair reference state is set as the "normal state", difference data is accumulated in the volumes inside this site, or there is a possibility that such difference data may be accumulated. Accordingly, it is registered in the freshness management information 31 that the volumes inside this site are the reference volumes that hold the most recent data.

Next, the ensuring module sends a notification indicating that a change has occurred in the freshness management information 31 to the ensuring modules 30 respectively disposed in the other host computers H, and causes this freshness management information 31 to be held (S44). In the present embodiment, this notification and registration processing of the freshness management information 31 is called "other-site registration processing". Furthermore, this is not limited to the ensuring modules 30 of "other sites"; the other ensuring modules 30 within the first ensuring module's own site are also notified, and registration is requested. Details of this other-site registration processing will be described later with reference to FIG. 11.

Next, a judgement is made in order to ascertain if the respective ensuring modules 30 of the respective sites have respectively been notified of the updating of the freshness management information 31, and if this information has been registered (S45). In cases where all of the notification and registration request processing of the freshness management information 31 is successful, "successful" is set as the return value (S46). In cases where notification of the freshness management information 31 or the like has failed in any one of the ensuring modules 30, "failure" is set as the return value (S47).

On the other hand, in cases where any of the site names is registered as the current pair reference state in the abovementioned S42 (or to express this in opposite terms, in cases where the state is a state other than the "normal state"), a judgement is made as to whether or not the registered site name is the ensuring module's own site name (S48).

In cases where the ensuring module's own site name has already been registered in the freshness management information 31, "successful" is set as the return value (S49). In cases where the site name registered in the magenta ink 31 is the name of another site, "failure" is set as the return value (S50). Cases in which other site names have been registered in the pair reference state relating to the volume whose use is desired are cases in which the desired volume does not store the most recent data, so that this volume cannot be used as the reference volume following the occurrence of remote copying trouble. Accordingly, in this case, "failure" is set as the return value.

Figure 11:
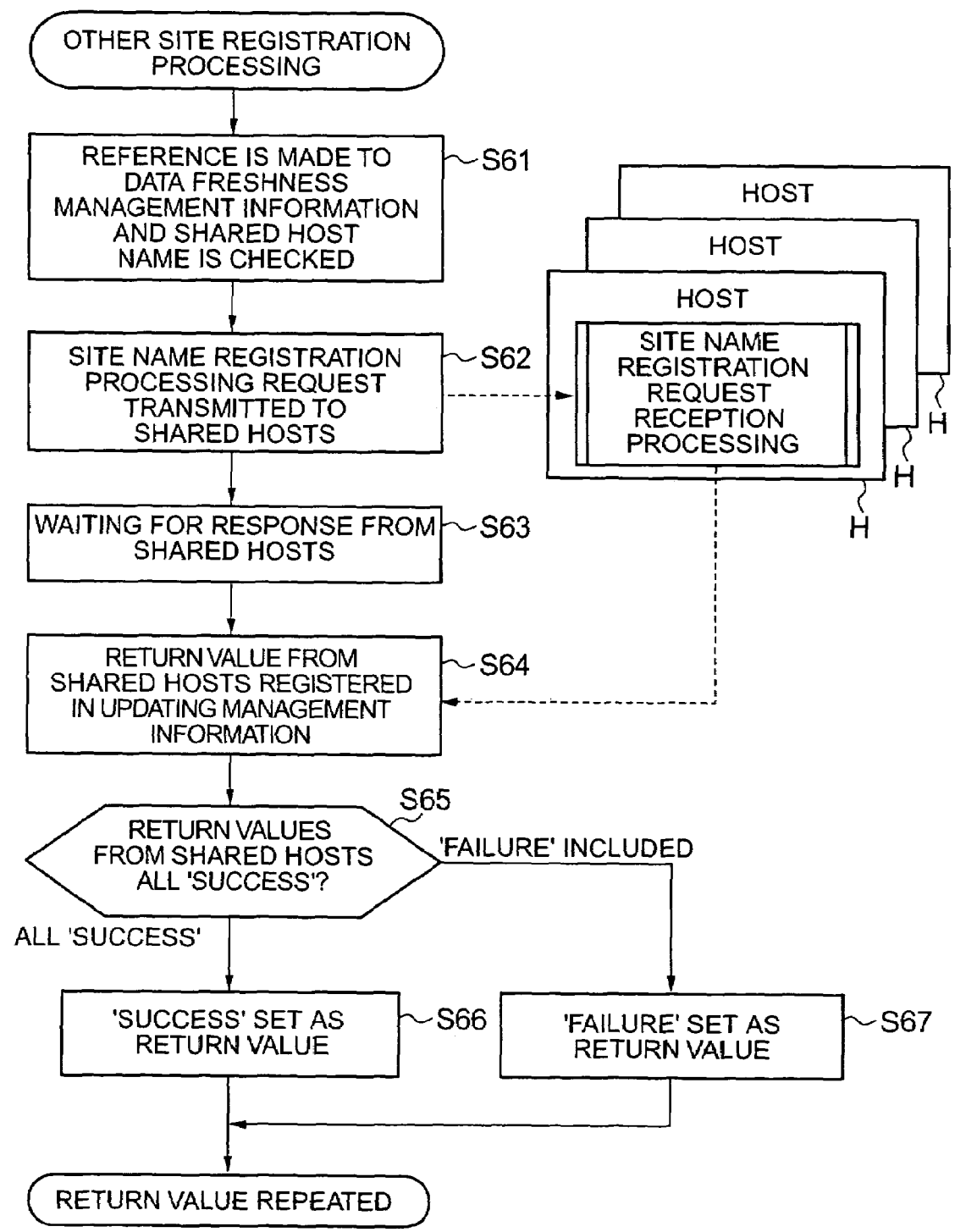
FIG. 11 is a flow chart of the "other site" registration processing.

FIG. 11 is a flow chart that shows the details of the "other-site registration processing" shown as S44 in FIG. 10. First, the ensuring module 30 refers to the freshness management information 31, and specifies the host computer H that is to be notified (S61). Specifically, all of the host computers H that share the volume whose pair reference state has been altered are detected.

Next, the ensuring module 30 respectively sends notification of the updated pair reference state to the ensuring modules 30 of the respective host computers H that share this volume, and respectively requests the initiation of site name registration processing (S62). The details of this site name registration processing will be described later with reference to FIG. 12; briefly, however, this is processing that requests updating of the pair reference state from the other ensuring modules 30.

Then, the ensuring module 30 waits for a response from the other respective host computers H (ensuring modules 30) that have been notified of the pair reference state (S63). The ensuring module 30 respectively registers the response results from the other respective ensuring modules 30 in the "updating results" column of the updating management information 32 (S64).

The ensuring module 30 refers to the updating management information 32, and makes a judgement as to whether or not all of the responses (return values) from the other respective ensuring modules are "successful" (S65). Cases where all of the updating results of the updating management information 32 are "successful" are cases in which normal notification and updating of the pair reference state has been accomplished; accordingly, "successful" is set as the return value (S66). On the other hand, cases in which even a single "failure" is registered in the updating result column are cases in which host computers H for which the volume that is to be used as a reference cannot be accurately identified are present. In such cases, there is a possibility that erroneous operation will be performed by the host computers in which accurate identification cannot be accomplished. Accordingly, "failure" is set as the return value (S67).

Figure 12:
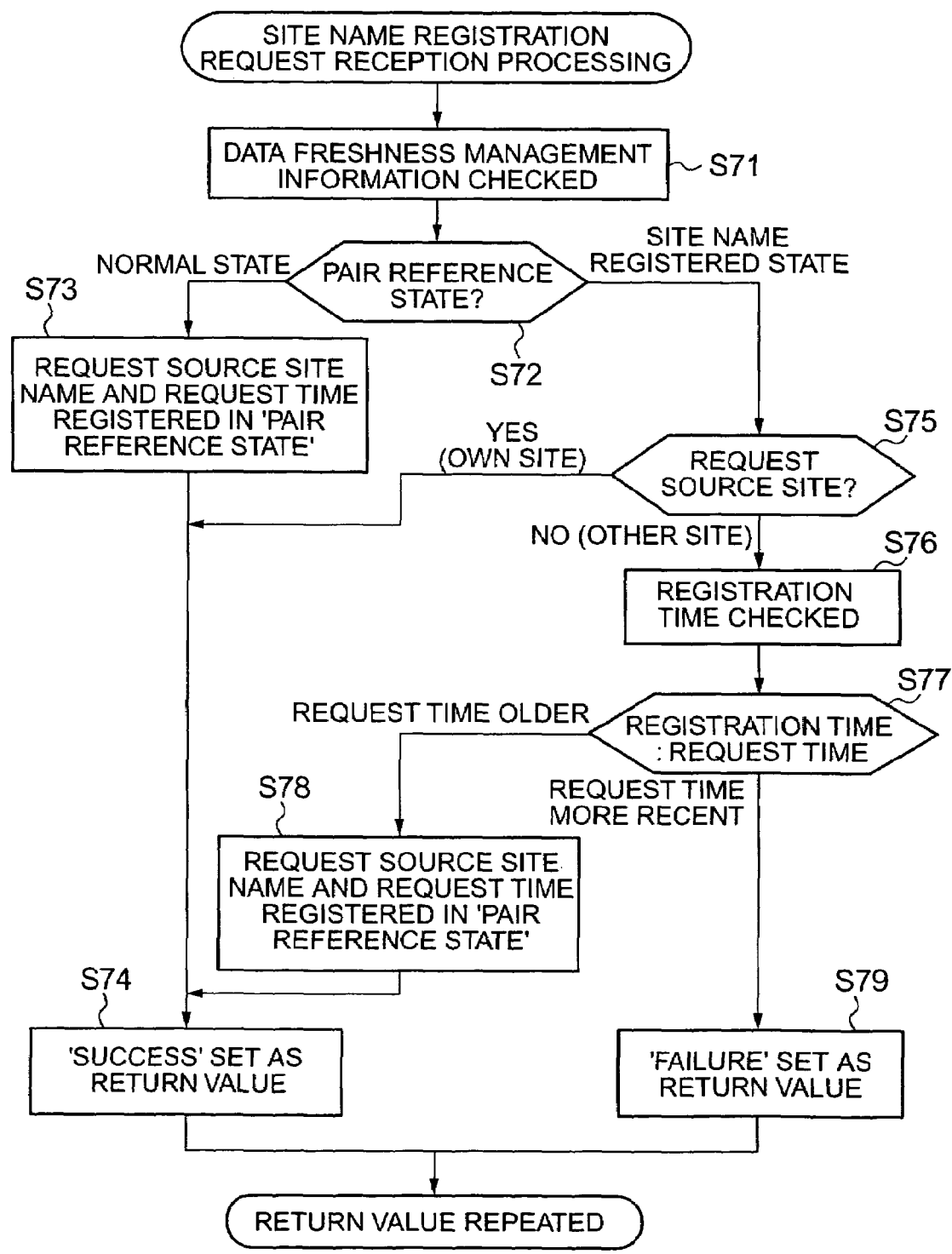
FIG. 12 is a flow chart of the site name registration request reception processing.

FIG. 12 is a flow chart showing the processing of requests for the registration of site names as the pair reference state in relation to S62 in FIG. 11.

When a site name registration processing request is received from the ensuring module 30 that has updated (produced) the pair reference state, the processing shown in FIG. 12 is performed. Here, the site name registration processing request that is issued by the ensuring module 30 constituting the notification source contains a copying pair number that is used to specify the pair volumes whose pair reference state has been altered, the pair reference state updating time, and the content of the updated pair reference state.

First, the ensuring module 3 that has received notification checks its own freshness management information 31 (S71). The ensuring module 30 that has received notification checks the pair reference state relating to the notified volumes (S72). In cases where "normal state" is set as the pair reference state of the notified volumes, the ensuring module 30 that is the notification destination rewrites the current pair reference state as the notified pair reference state (S73).

Specifically, the name of the site in which the ensuring module 30 that has requested site name registration is present (requesting source site name) and the time at which the pair reference state was updated by the requesting source site name, are registered in the ensuring module's own freshness management information. Furthermore, the ensuring module 30 constituting the notification destination sends a response of "successful" to the ensuring module 30 that is the notification source (S74).

Meanwhile, in cases where a site name has already been registered in the freshness management information of the notification destination in S72, a judgement is made as to whether or not this registered site name and the site name of the notification source (requesting source) match (S75). In cases where the registered site name and the site name of the notification source match (S75: YES), "successful" is set as the return value (S74). In cases where the registered site name and the site name of the notification source do not match (S75: NO), the time at which the registered site name was registered (i. e., the time at which the pair reference state was updated) and the time at which the notified site name was updated are respectively identified (S76), and these times are compared (S77). In other words, if the already registered site name is called the old pair reference state, and the newly notified site name is called the new pair reference state, then the time at which the old pair reference state is produced in the ensuring module 30 of a certain host computer H (called the "registration time" in the figures) and the time at which the new pair reference state is produced in the ensuring module 30 of a separate host computer H (called the "request time" in the figures) are compared.

In cases where the production time of the new pair reference state is older, the site name and production time are respectively registered in the freshness management information as the new pair reference state (S78), and "successful" is set as the return value (S74). On the other hand, in cases where the production time of the new pair reference state is more recent than the production time of the old pair reference state, "failure" is set as the return value without updating the freshness management information (S79). In other words, pair reference state that is produced earlier has priority. The reason for this is that the possibility of the most recent data being accumulated earlier is greater in the site in which the pair reference state is produced first.

Thus, in the present embodiment, in cases where there are competing notifications of the pair reference state, difference data that is accumulated earlier is treated with greater importance by giving priority to the older pair reference state.

Figure 13:
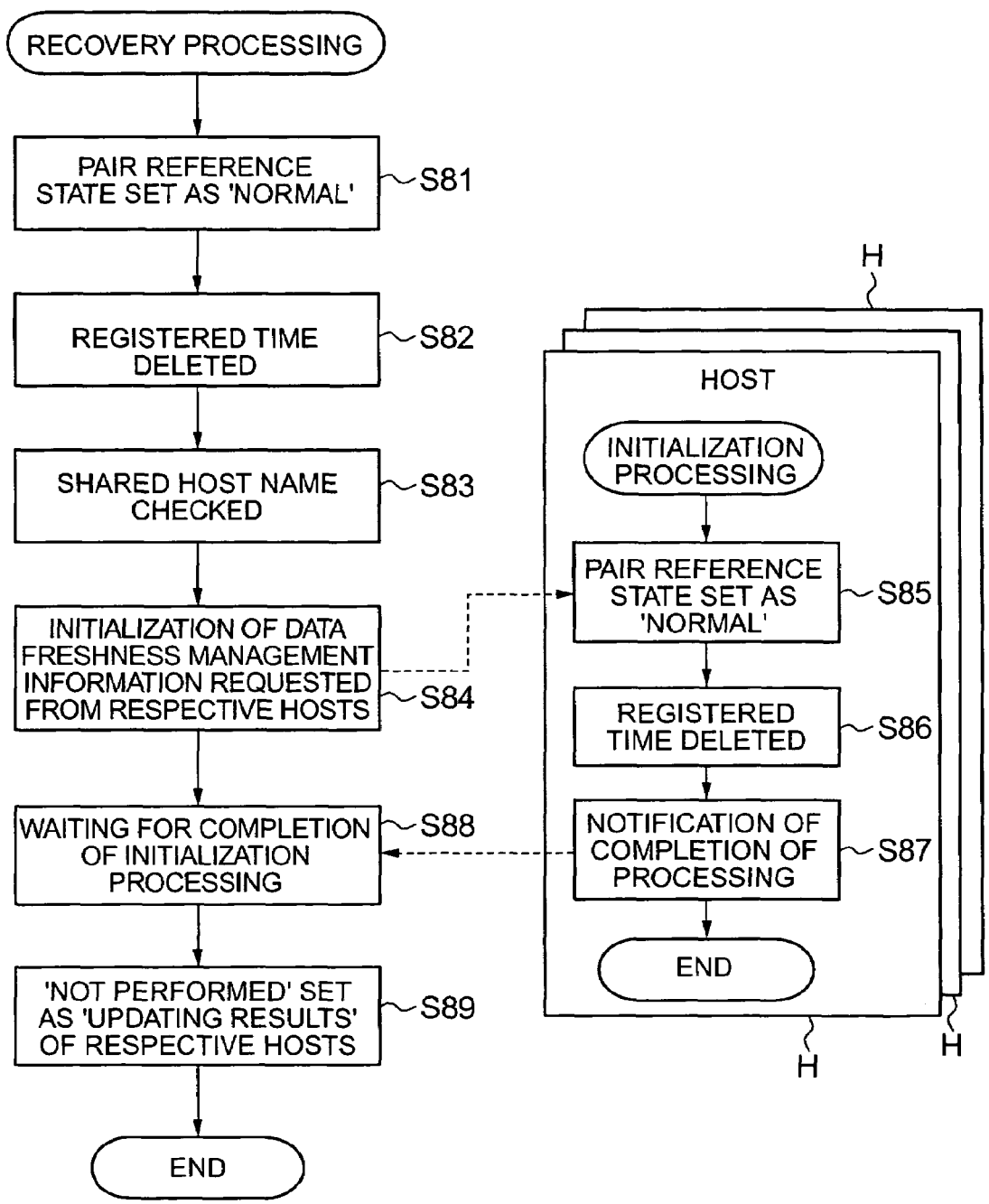
FIG. 13 is a flow chart of the recovery processing.

FIG. 13 is a flow chart that shows the recovery processing. For example, this recovery processing can be performed manually be the system manager in cases where it is desired to re-form a copying pair following recovery from remote copying trouble.

First, the ensuring module 30 respectively sets the respective pair reference states registered in the freshness management information 31 in the "normal state", and initializes the pair reference states (S81). Furthermore, the ensuring module 30 respectively deletes the respective updating times registered in the freshness management information 31, and take-up spring initializes the updating times (S82).

Next, for each copying pair (i. e., for each pair volume), the ensuring module 30 checks the names of the host computers H that are jointly using this volume (S83). The ensuring module 30 respectively requests the initialization of the freshness management information of the respective ensuring modules 30 or the respective host computers H that are checked (S84).

The other ensuring module 30 that receives this initialization request returns the pair reference state to the "normal state" (S85), deletes the updating time (S86), and notifies the ensuring module 30 that is the source of the initialization request that the initialization of the freshness management information has been completed (S87).

The ensuring module 30 that requested the initialization of the freshness management information waits for an initialization completion notification from the other ensuring module 30 (S88), and each time that an initialization completion notification arrives, this ensuring module 30 sets "not performed" in the updating result column of the updating management information 32 (S89).

Here, it is not necessary to initialize all of the freshness management information 31 in a single operation; it is sufficient to initialize only the parts that relate to the recovery from remote copying trouble. Furthermore, the ensuring module that is the source of the initialization request may be constructed so that the updating management information 32 is updated each time that an initialization completion notification is received, or may be constructed so that the received initialization completion notifications are stored in memory, and the updating management information is updated at one time after all of the initialization completion notifications have been received.

Figure 14:
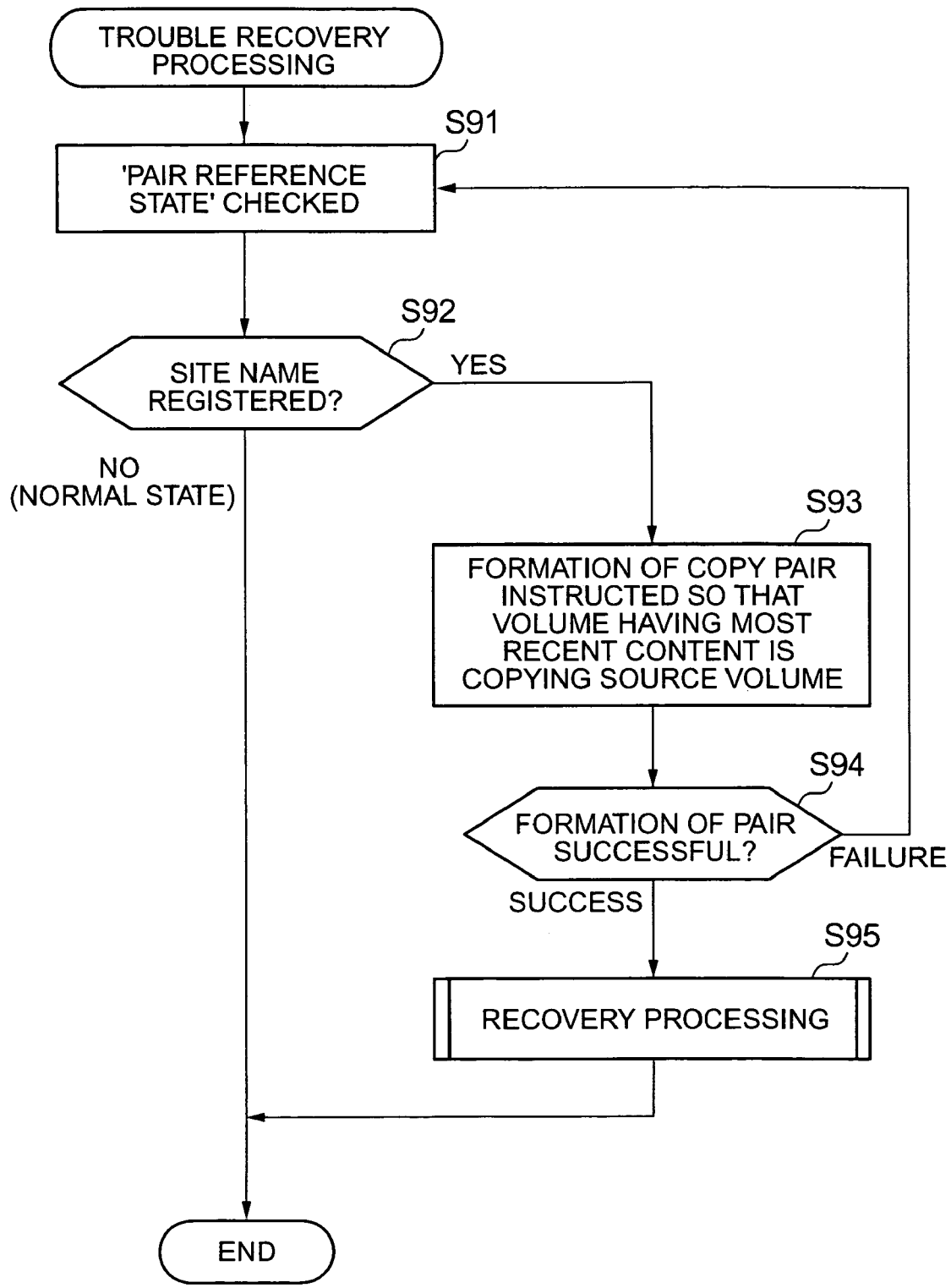
FIG. 14 is a flow chart of the trouble recovery processing.

FIG. 14 is a flow chart of the trouble recovery processing. This trouble recovery processing is processing that is performed in order to accomplish automatic execution of the recovery processing described with reference to FIG. 13. This trouble recovery processing may be executed by the ensuring module 30, or may be executed by a module that is separate from the ensuring module 30. Here, a case in which this is one function of the ensuring module 30 will be described.

Here, the cluster software relating to FIG. 14 is software provided with a function that periodically outputs survey requests to the copying management resources 42 in order to ascertain whether or not recovery from trouble has been achieved following the occurrence of trouble such as remote copying trouble or the like. In cases other than that shown in FIG. 14, the cluster software need not necessarily have such a periodic trouble recovery survey function.

The copying management resources 42 receive a survey instruction from the cluster software 40, and perform a survey in order to ascertain whether or not there has been a recovery from trouble. In cases where there has been a recovery from trouble, the copying management resources 42 notify the ensuring module 30 that there has been a recovery from trouble. When this notification is received, the trouble recovery processing shown in FIG. 14 is performed.

The ensuring module 30 checks only one part (one line) of the pair reference state registered in the freshness management information 31 (S91), and judges whether or not a site name is registered in the pair reference state (S92). In cases where "normal state" is registered in the pair reference state (S92: NO), the processing is ended.

In cases where either "first site state" or "second site state" is registered in the pair reference state (S92: YES), the ensuring module 30 sends an instruction for copying pair formation to the remote copying control module 50 so that the pair state of the volume having the most recent data content is "copying source state" (S93).

In cases where there is a failure in the formation of a copying pair (S94: failure), this indicates a case in which there has not been a complete recovery from the remote copying trouble, or in which new remote copying trouble has occurred. Accordingly, the operation of the copying pair is closed down, and the processing returns to S91. Then, the next pair reference state is checked.

In cases where the operation of the copying pair is successful (S94: successful), the recovery processing described in FIG. 13 is initiated (S95). As a result, after the remote copying function recovers from trouble, initialization of the freshness management information 31 and the like can be performed automatically.

Figure 15:
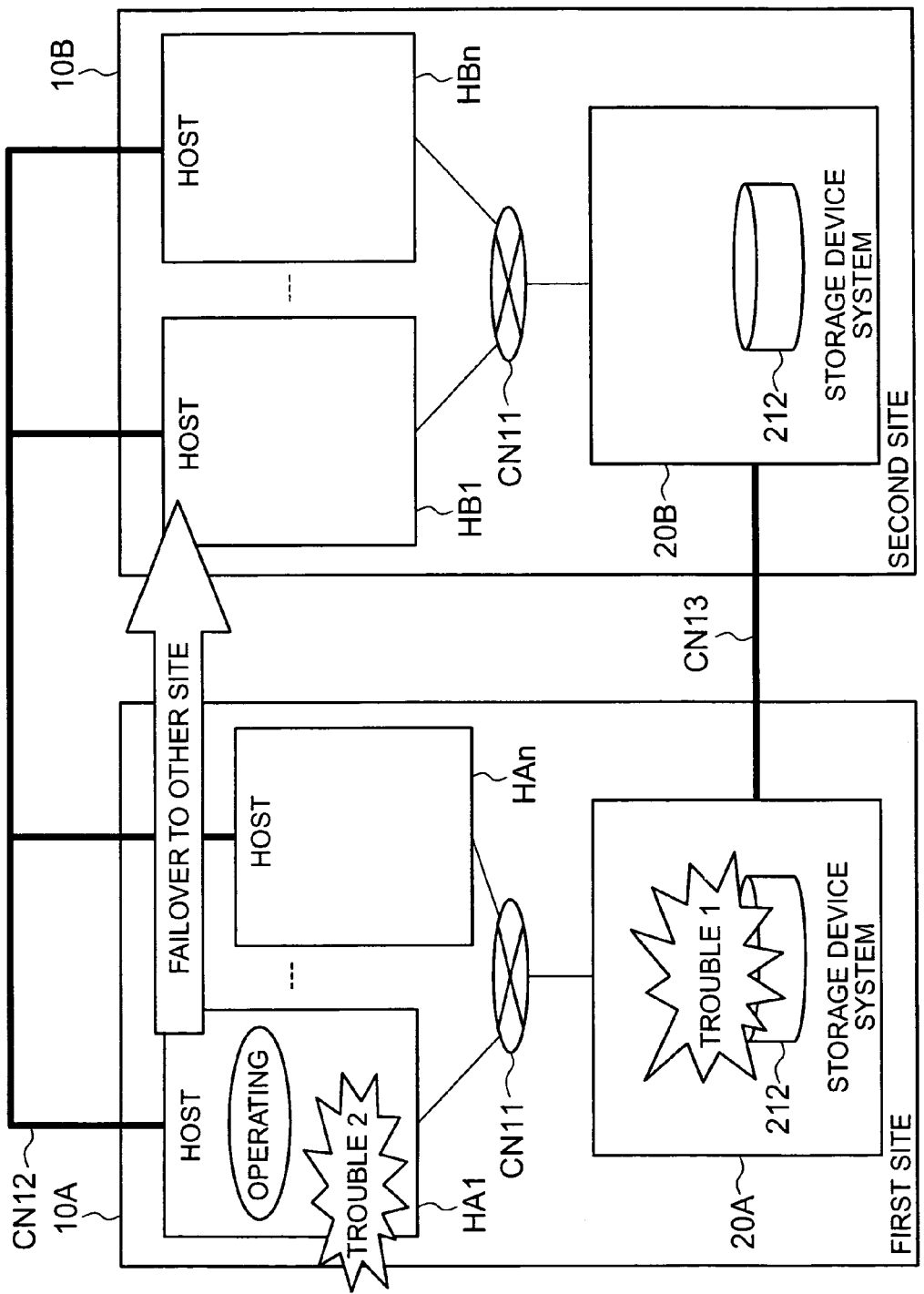
FIG. 15 is a model diagram which shows the first trouble occurrence pattern.
Figure 16:
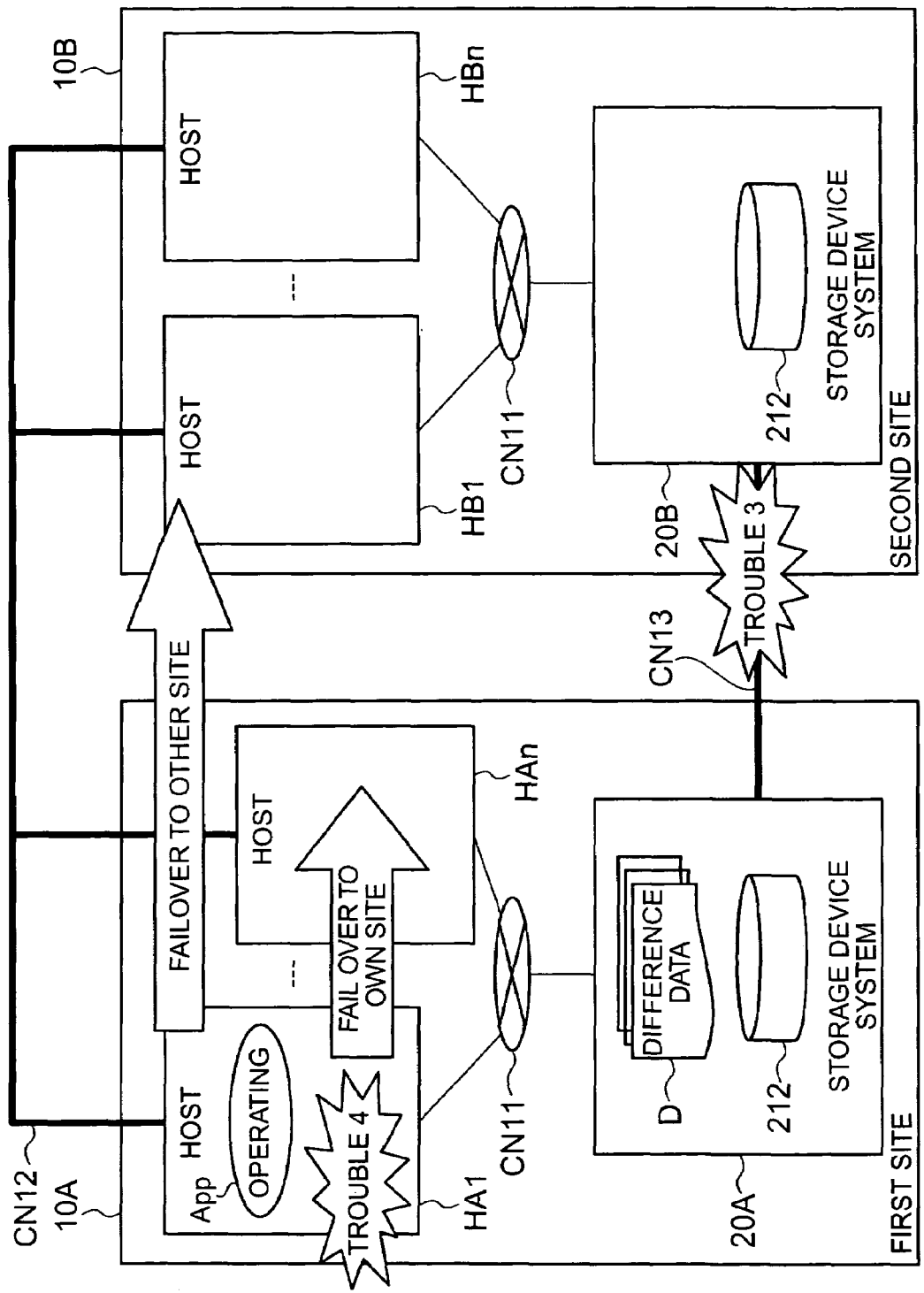
FIG. 16 is a model diagram which shows the second trouble occurrence pattern.

FIGS. 15 and 16 are explanatory diagrams showing an outline of the overall operation in a case where trouble has occurred. First, at a certain point in time, it is assumed that a first trouble occurs in the storage device system 20A. As a result of this trouble inside the storage device system, the remote copying function also stops. It is further assumed that a business processing service (operation) is being performed by the host computer HA1.

After the [abovementioned] trouble has occurred in remote copying, it is assumed that a separate second trouble occurs in the operating host computer HA1, and that the operation of the business processing service is stopped. As a result, it becomes necessary for failover to be executed by the other host computers HAn and HB1 through HBn.

Various methods are known as methods for selecting the failover destination. For example, there is a method in which failover is performed in sites in which the number of nodes that are present (i. e., the number of normal host computers) is large, and a method in which the failover destination is randomly selected using quasi-random numbers or the like.

In the first trouble occurrence pattern sown in FIG. 15, the storage device system 20A of the first site 10A has stopped functioning as a result of a first trouble; accordingly, failover is executed by any of the host computers HB1 through HBn of the second site 10B. In the host computer that is the failover destination, the volume that was used as a copying destination volume prior to the occurrence of trouble is reversed to a copying source volume, and provides the business processing service.

FIG. 16 shows a second trouble occurrence pattern. In this example, it is assumed that a third trouble has occurred in the remote copying line CN13. As a result of this trouble, the copying source volume and copying destination volume cannot be synchronized. In the first site 10A, new data is constantly generated by I/O requests from the host computers HA1 through HAn. Since such newly updated data cannot be transferred to the copying destination volume, this data is accumulated in the storage device system 20A as difference data D.

Following the occurrence of remote copying [trouble], it is assume that a fourth trouble occurs in the operating host computer HA1, so that the function of this computer is stopped. As was described above, for example, the failover destination is determined either randomly or as a site with a large number of existing nodes.

In cases where one of the host computers HB1 through HBn of the second site 10B is selected as the failover destination, there is a possibility that the host computers HB may restart the provision of the business processing service using a volume that is not synchronized (i. e., a copying destination volume prior to the occurrence of trouble). However, in the present embodiment, as was described above, the volume that is to be used as a reference is managed by the ensuring module 30, and a query is sent to the ensuring module 30 regarding the possibility of using this volume prior to the initiation of the use of this volume.

Accordingly, in the present embodiment, as long as there is no recovery from the remote copying trouble so that recovery processing is not performed, none of the respective host computers HB1 through HBn in the second site 10B can operate as a failover destination.

As a result of the failure of the selection of the failover destination in the second site 10B, a host computer HAn within the first site 10A is selected as the failover destination. Since the most recent data is held in the first site 10A, a host computer HA in the first site 10A is suitable as a failover destination.

In other words, in the present embodiment, in the case of remote copying trouble, the necessary volumes cannot be used in the case of host computers that are unsuitable as the failover destination; consequently, failover processing cannot be performed by means of such unsuitable host computers. Accordingly, the initiation of erroneous operation on the basis of old data can be prevented in advance.

As a result of being constructed as described above, the present embodiment has the following effects. In the present embodiment, the volume (or storage device system or site) acting as a reference that holds the most recent data is specified and managed, and the use of volumes is controlled on the basis of the freshness management information 31. Accordingly, for example, the initiation of separate control processing such as failover processing or the like on the basis of old data following the occurrence of remote copying trouble can be prevented in advance. As a result, the reliability of the storage system can be improved; furthermore, remote copying processing and failover processing can be matched, so that a more effective disaster recovery system can be constructed.

In the present embodiment, in cases where the use of pair volumes is initiated following the occurrence of remote copying trouble, a construction is used in which the pair state of the freshness management information 31 is updated, and the other ensuring modules 30 are notified of this. Accordingly, for example, the reliability of the storage system can be heightened while reducing the burden on the host computers and networks compared to cases in which the updating of the pair state and notification [of this updating] are performed periodically.

2. Second Embodiment

A second embodiment will be described with reference to FIGS. 17 through 20. One characterizing feature of the present embodiment is that the use of volumes is possible even in cases where notification of the updating management information was not processed normally for some of the host computers.

Figure 17:
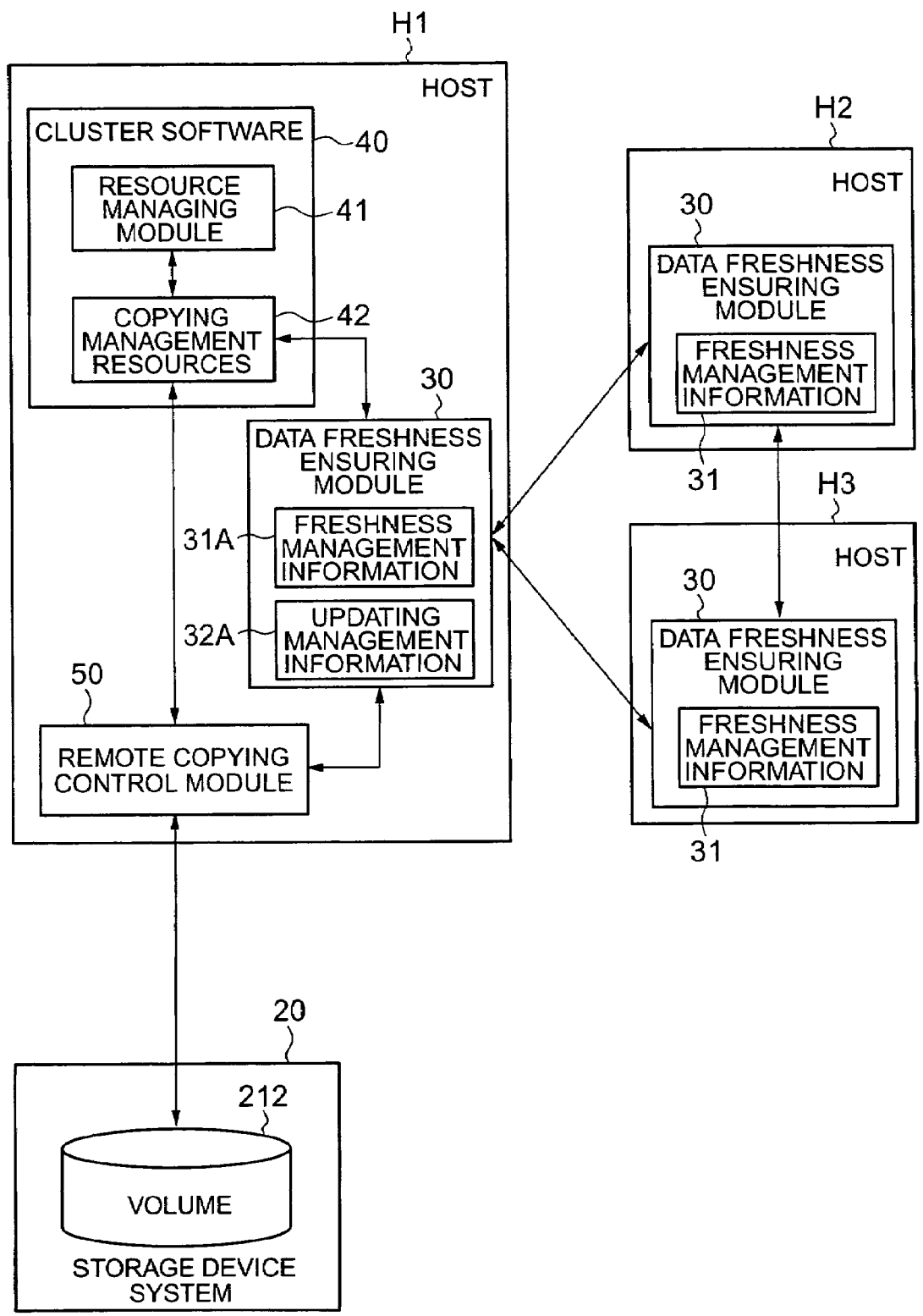
FIG. 17 is a block diagram which shows the host computer software construction of a storage system constituting a second embodiment.

FIG. 17 is a block diagram which shows an outline of the functional construction of the host computers that form a part of the storage system of the present embodiment. The functional construction of the software is substantially the same as in the first embodiment; however, the constructions of the freshness management information 31A and updating management information 32A differ from those in the first embodiment.

As is shown in FIG. 18, new "policy" information is caused to correspond to the respective copying pairs in the freshness management information 31A. For example, this "policy" refers to information that is used to designate the reference site (volume or storage device system) beforehand, which is provided in cases where the exchange of freshness information becomes impossible as a result of trouble in the network CN12 between the host computers, trouble within the host computers or the like.

For example, the site name such as "first site state" or "second site state" can be set in the policy. Alternatively, the "operating site prior to the occurrence of trouble" or "standby site prior to the occurrence of trouble" can also be set as the policy. The "operating site prior to the occurrence of trouble" is information which takes the site that was the operating site prior to the occurrence of trouble as the reference site following the occurrence of trouble, while the "standby site prior to the occurrence of trouble" is information that takes the site that was the standby site prior to the occurrence of trouble as the reference site following the occurrence of trouble.

New "home site" information can be respectively caused to correspond to the respective host computers in the updating management information 32A. This "home site" is information that is used to specify the site to which the host computer belongs.

Figure 19:
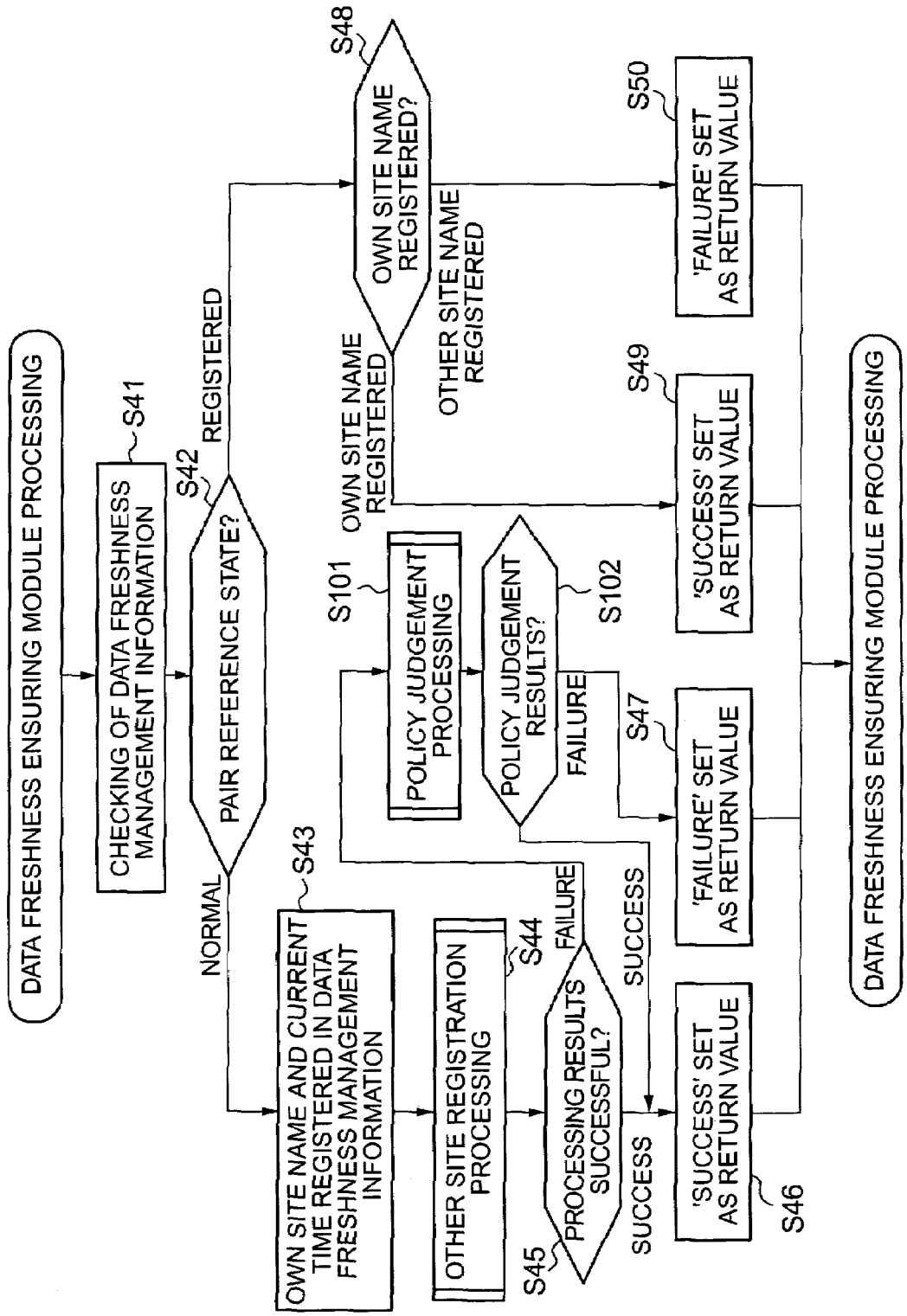
FIG. 19 is a flow chart of the data freshness ensuring module processing.

FIG. 19 is a flow chart of the data freshness ensuring module processing that is performed by the ensuring module 30. To describe the portions that are characteristic of the present embodiment, policy judgement processing is performed (S101) in cases where the other-site registration processing ended in failure (S45: failure). Details of the policy judgement processing will be described later with reference to FIG. 20.

Next, in cases where the judgement results of the policy judgement processing are "successful", the use of the desired volume is possible; accordingly, "successful" is set as the return value (S46). On the other hand, in cases where the policy judgement results are "failure", the use of the desired volume is not possible; accordingly, "failure" is set as the return value (S47).

In other words, in the present embodiment, in cases where the updating processing (site name registration request reception processing) of the freshness management information in some of the ensuring modules 30 is not performed normally, the volumes are not immediately designated as unusable; instead, the usability is re-judged by referring to a preset policy. As a result, the use of volumes may be permitted on the basis of this policy even in cases where communications trouble or the like occurs in the network CN12 between the host computers, so that the other-site registration processing ends in failure.

Figure 20:
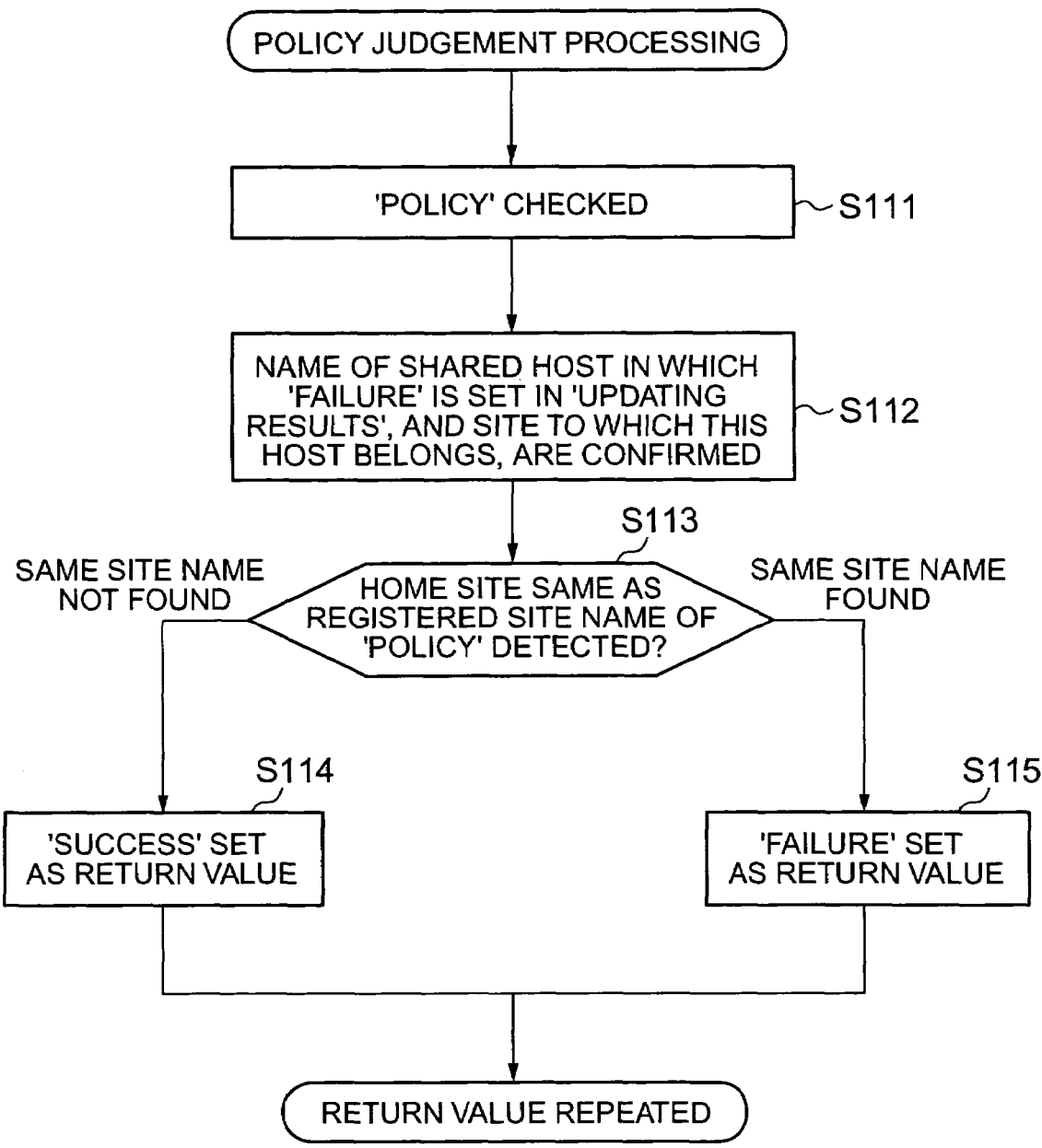
FIG. 20 is a flow chart of the policy judgement processing.

FIG. 20 is a flow chart of the policy judgement processing indicated by S101 in FIG. 19. First, the ensuring module 30 checks the policy that is set in the freshness management information 31A (S111). The ensuring module 30 refers to the updating management information 32A, and checks the names and home site names of the host computers for which "failure" is set in the updating result column (S112). The host computers for which "failure" is set in the updating result column are host computers that cannot perform updating of the freshness management information.

Next, the ensuring module 30 compares the policy site names that are set in the freshness management information 31A (hereafter referred to as the "policy registration site names") and the names of the sites to which the newly failed host computers belong (hereafter referred to as the "failed site names") and judges whether or not the policy registration site names and failed site names agree (S113).

In cases where the policy registration site names and failed site names do not agree, i. e., in cases where policy registration site names are not included in the failed site names, communications to the sites designated beforehand as preferential sites are performed normally; accordingly, the ensuring module 30 sets "successful" as the return value (S114).

In cases where the policy registration site names and failed site names agree, i. e., in cases where policy registration site names are included in the failed site names, this means that some type of trouble has occurred in the site that is to be used as a reference; accordingly, "failure" is set as the return value (S115).

However, in cases where an erroneous policy is set even though the policy judgement results were "successful", the volume cannot be used. For example, such a case is a case in which the second site 10B is set as a preferential site, and other-site registration processing is performed in the first site 10A. In this case, if no trouble has occurred in the second site 10B, the policy judgement results are "successful"; however, the host computers HA of the first site 10A cannot utilize the storage device system 20B of the second site 10B. Accordingly, for example, the system can be constructed so that "successful" is set as the return value in cases where the policy registration site name and failed site name do not agree, and the policy registration site name and own-site name do agree. Alternatively, in cases where the policy is defined in the freshness management information 31A, the system can be constructed so that the matching of the preferential site name and own-site name is checked.

3. Third Embodiment

A third embodiment will be described with reference to FIG. 21. One of the characterizing features of the present embodiment is that preferential sites are selected in relative terms. In the second embodiment, a case was described in which preferential sites were directly designated as policy, as shown in the line of pair volume #1 in the freshness management information 31A in FIG. 18.

In the present embodiment, on the other hand, a case will be described in which preferential sites are designated in relative terms as policy, as respectively indicated in pair volumes #2 and #3 of the freshness management information 31A shown in FIG. 18.

Figure 21:
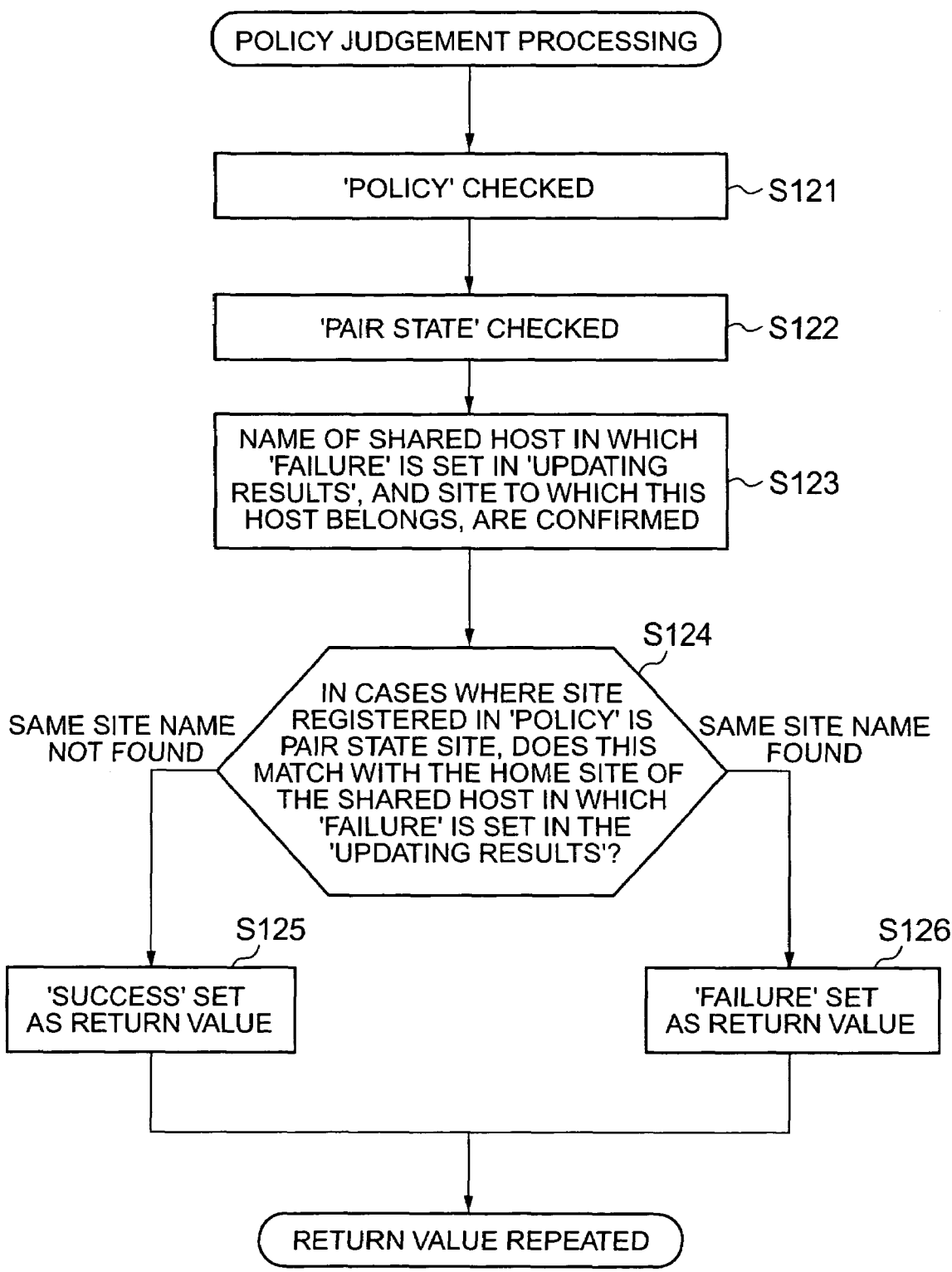
FIG. 21 is a flow chart of the policy judgement processing of a storage system constituting a third embodiment.

In the policy judgement processing of the present embodiment, as is shown in FIG. 21, after the policy is checked by referring to the freshness management information 31A (S121), the pair states of the object pair volumes (copying source, copying destination, pair division) are checked (S122). Furthermore, the ensuring module 30 checks the failed site names by referring to the updating management information 32A (S123).

Next, the ensuring module 30 judges whether or not the relatively designated policy registration site names and current pair states agree; furthermore, in cases where the current pair states match the policy, the ensuring module 30 judges whether or not the policy registration site names and failed site names agree (i. e., whether or not policy registration site names are included in the failed site names) (S124).

In cases where the policy registration site names and failed site names do not agree, the ensuring module 30 sets "successful" as the return value (S125). In cases where the policy registration site names and failed site names do agree, the ensuring module 30 sets "failure" as the return value (S126).

A concrete example will be described. For example, in a case where the pair state of the desired volume is "copying source state" and the policy is "operating site prior to trouble", the current pair state and the policy agree. Furthermore, in this case, since the site is the ensuring module's own site, the failed site name and policy registration site names do not agree. Accordingly, the use of this copying source volume is permitted.

4. Fourth Embodiment

Figure 22:
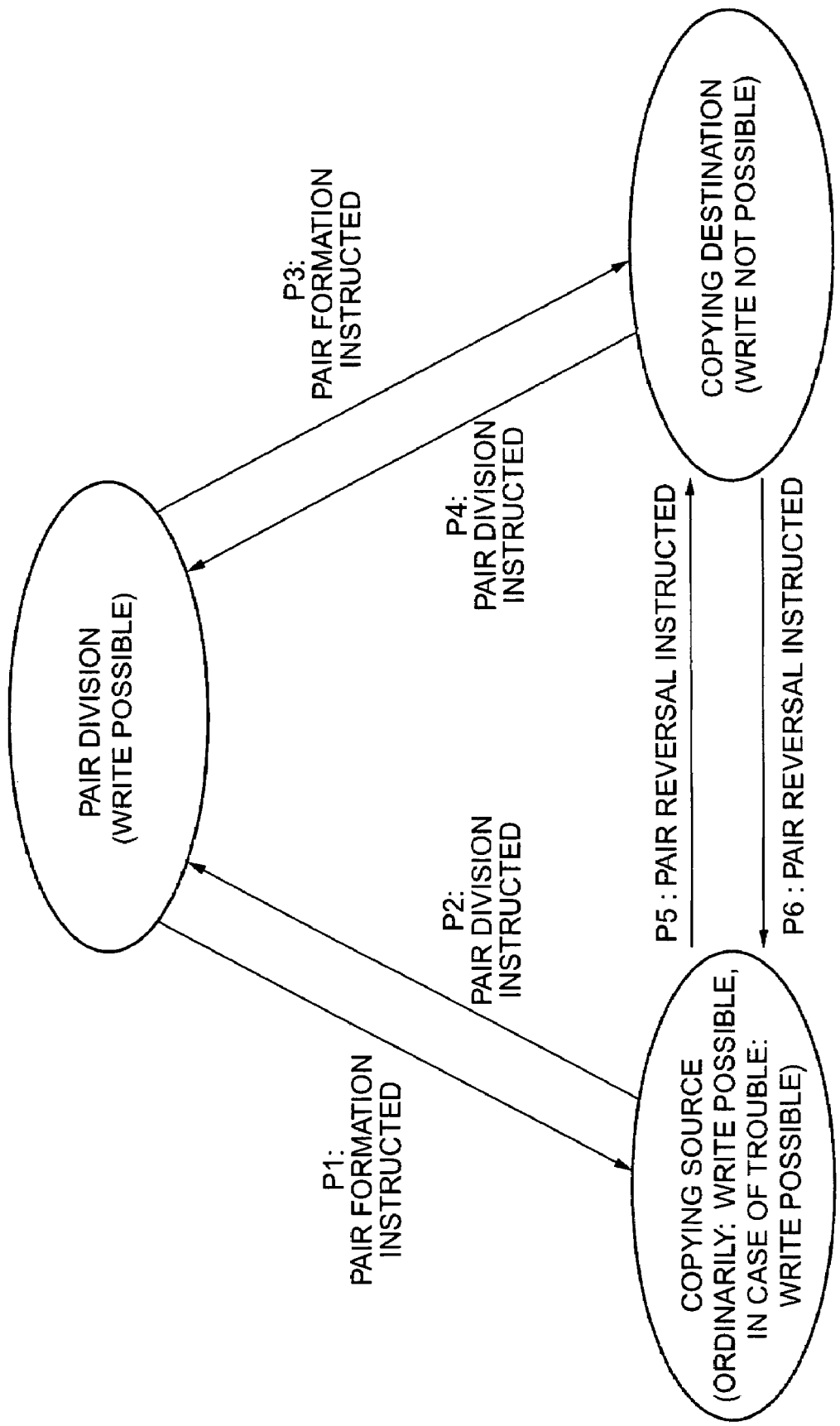
FIG. 22 is a transition diagram of the pair state of the storage system constituting a fourth embodiment.

A fourth embodiment will be described with reference to FIG. 22. In the present embodiment, one of the characterizing features is that write access from the host computers H is possible in cases where the pair state is "copying source state (abnormal)".

If such a construction is used, the operation in the case of remote copying trouble is the same operation as in a case in which the operating site prior to the occurrence of trouble is set in the policy in the third embodiment. In other words, in the present embodiment, in cases where trouble occurs in remote copying, the host computers of the operating site can be used while continuing to use the copying source volume used up to this point "as is".

Furthermore, even in cases where remote copying is not performed, write access (and read access) to the copying source volume are permitted; accordingly, the present embodiment can be used in the case of so-called asynchronous remote copying. Specifically, in the case of asynchronous remote copying, the stopping period of remote copying is in effect the same as the period in which trouble occurs in remote copying in the case of synchronous remote copying.

5. Fifth Embodiment

Figure 23:
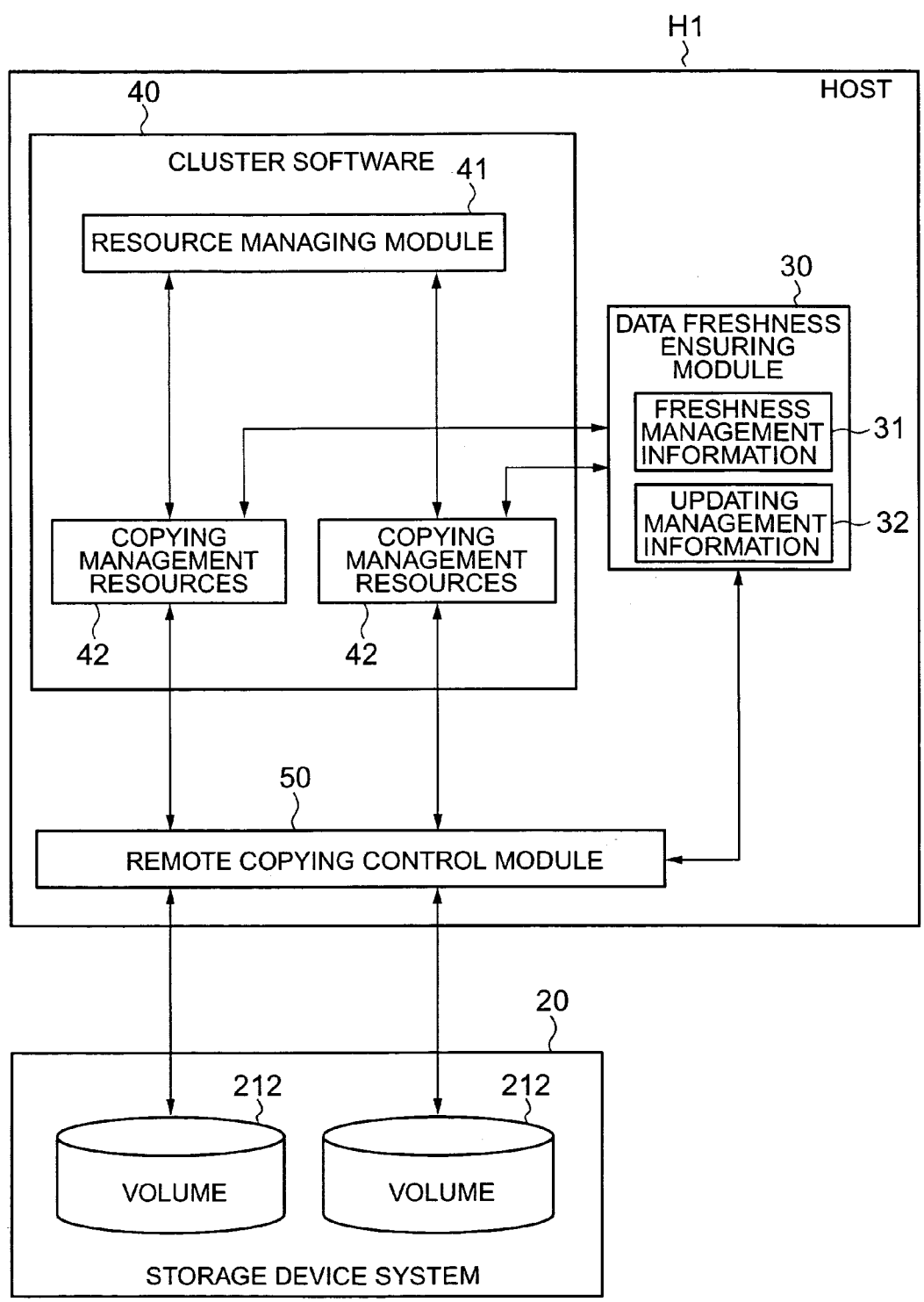
FIG. 23 is a block diagram which shows the host computer software construction of a storage system constituting a fifth embodiment.

In a fifth embodiment, as is shown in FIG. 23, a plurality of copying management resources 42 are installed in the cluster software 40, and a plurality of volumes 212 are simultaneously used.

6. Sixth Embodiment

Figure 24:
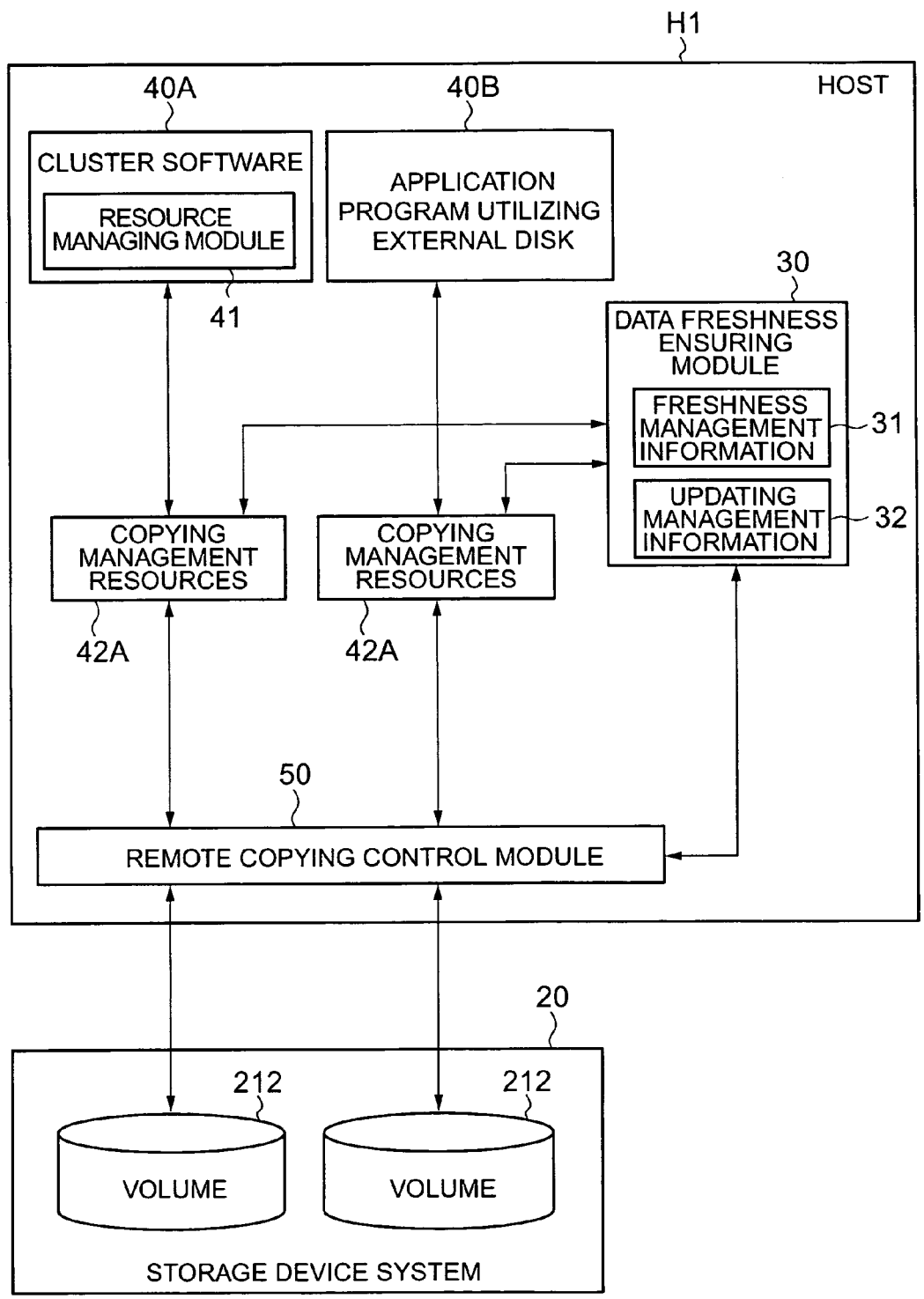
FIG. 24 is a block diagram which shows the host computer software construction of a storage system constituting a sixth embodiment.

In a sixth embodiment, as is shown in FIG. 24, the copying management resources 42A are made independent of the cluster software 40A. For example, the cluster software 40A calls up the copying management resources 42A at the time that the program is started, and utilizes on-line request processing or the like, in the same manner as other application programs 40B utilizing an external disk (logical volume) such as a data base application program or the like.

7. Seventh Embodiment

A seventh embodiment will be described with reference to FIG. 25. One characterizing feature of this embodiment is that the freshness management information is held in only one host computer in each site instead of being held in all of the host computers.

Figure 25:
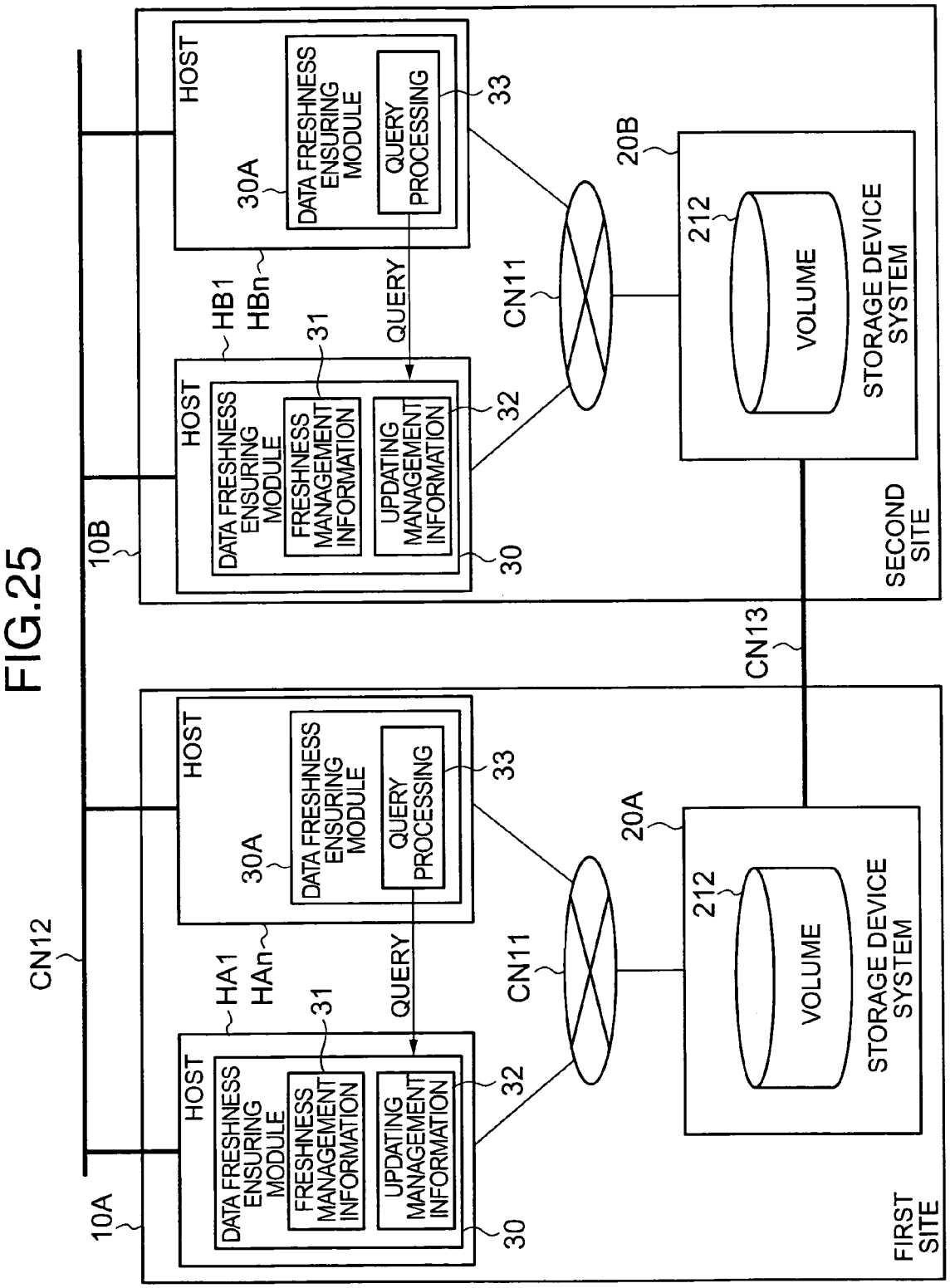
FIG. 25 is a block diagram of a storage system constituting a seventh embodiment.

As is indicated in the overall block diagram shown in FIG. 25, only one or more host computers HA1, HB1 hold the freshness management information 31 in each site 10A, 10B (the figure shows a case in which one host computer holds the information in each site). For example, these respective host computers HA1, HB1 can be called freshness management host computers.

Furthermore, the other host computers HAn and HBn acquire and use the freshness management information 31 from the freshness management host computers HA1 and HB1 by performing query processing 33. In other words, the ensuring modules 30A of the host computers other than the freshness management host computers HA1 and HB1 leave the execution of data freshness ensuring module processing to the ensuring modules 30 of the freshness management host computers HA1 and HB1, and utilize the processing results.

Figure 26:
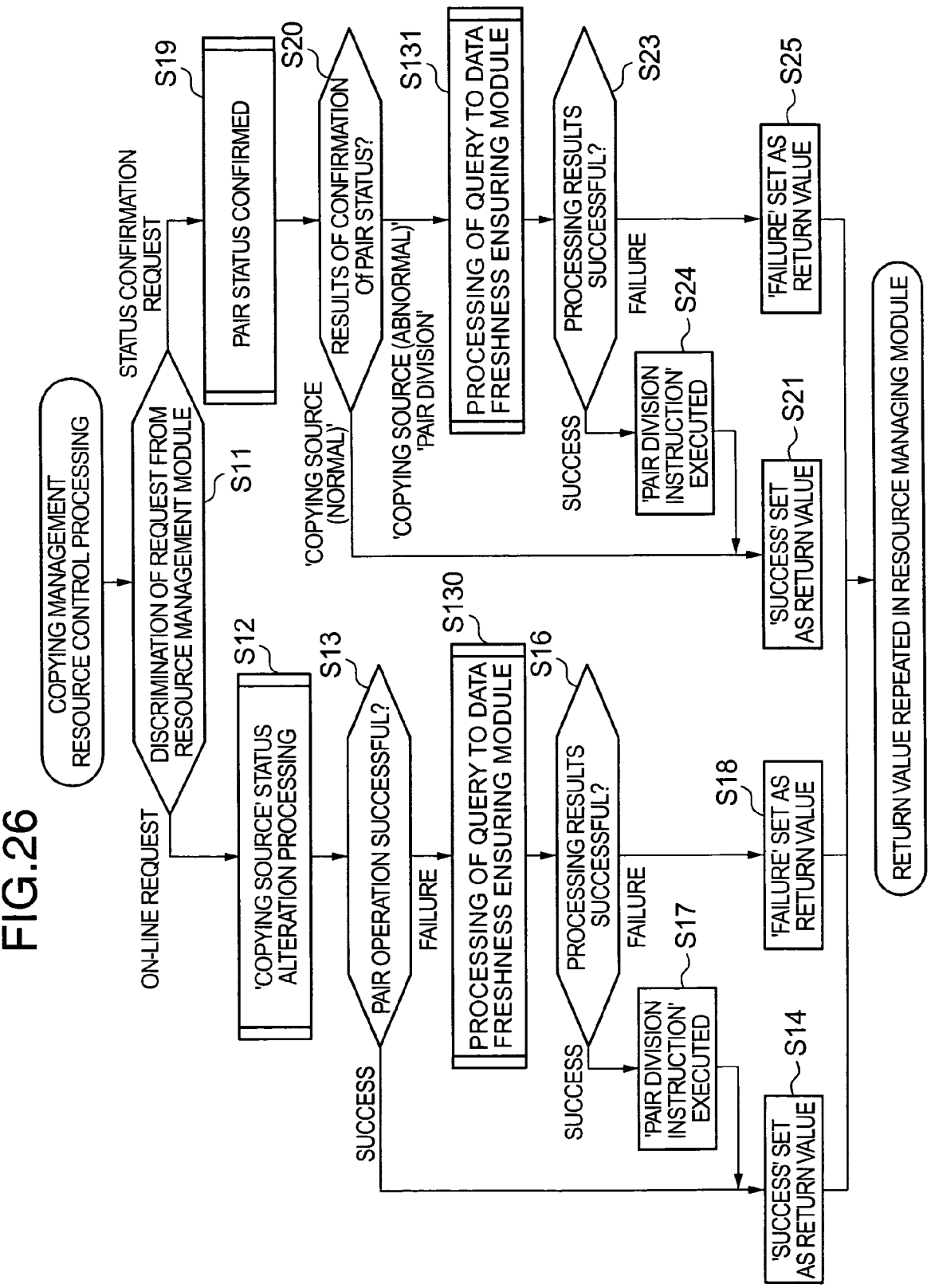
FIG. 26 is a flow chart of the copying management resource control processing.

FIG. 26 is a flow chart of the copying management resource control processing in the present embodiment. This processing is performed by host computers other than the freshness management host computers. The processing of the freshness management host computers is the same as in the abovementioned embodiments. In the present embodiment, the processing is left to the data freshness ensuring modules 30 of the freshness management host computers as respectively shown in S130 and S131.

Furthermore, from the standpoint of improving reliability, it is desirable to install a plurality of freshness management host computers in each site. Thus, the freshness management information 31 is not held in all of the host computers inside each site, but is instead held in only some (preferably a plurality) of these host computers. As a result, in cases where the updating of the freshness management information 31 by other-site registration processing is requested, the number of requesting source host computers can be reduced, so that the success rate of other-site registration processing can be increased.

8. Eighth Embodiment

Figure 27:
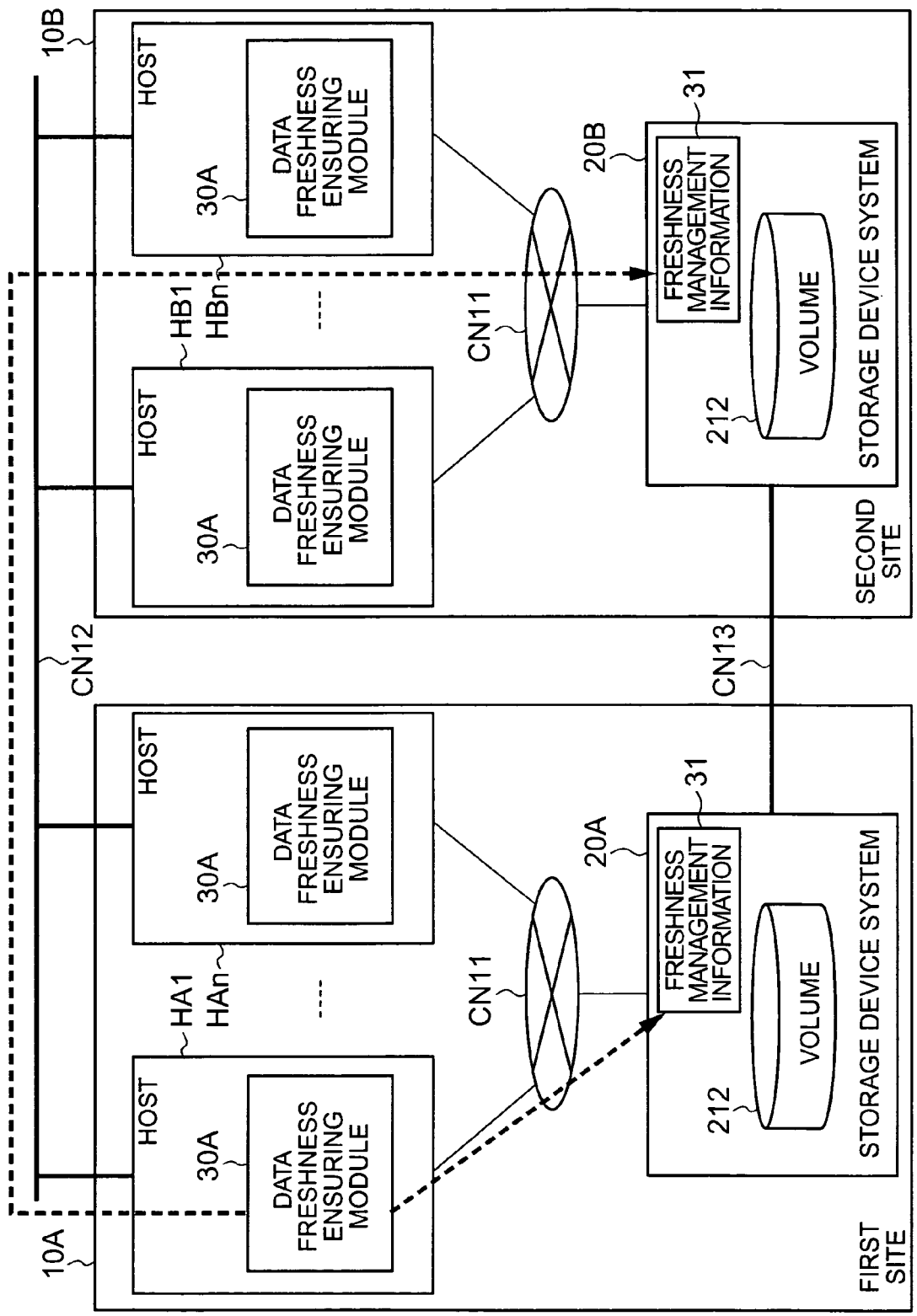
FIG. 27 is a block diagram of a storage system constituting an eighth embodiment.

FIG. 27 is an overall structural diagram of a storage system constituting an eighth embodiment. One of the characterizing features of this embodiment is that the freshness management information 31 is respectively held in each storage device system 20A and 20B.

In cases where trouble occurs in remote copying, the respective ensuring modules 30A specify the pair reference state, and register this in the freshness management information 31 inside the storage device systems. Then, when the respective ensuring modules 30A receive a query regarding volume usability from the copying management resources 42, the ensuring modules access the storage device system in their own site, and refer to the freshness management information 31.

Accordingly, in the other-site registration processing, not only can the freshness management information 31 be stored in the storage device systems 20A and 20B of the respective sites, but the success rate of the other-site registration processing can be increased. Furthermore, in cases where the freshness management information 31 is stored in the storage device system of the other site, the freshness management information 31 can be transmitted to one of the host computers present in this site via the network CN12 between host computers. The host computer H that receives the freshness management information 31 stores this freshness management information 31 in the storage device system of its own site.

9. Ninth Embodiment

Figure 28:
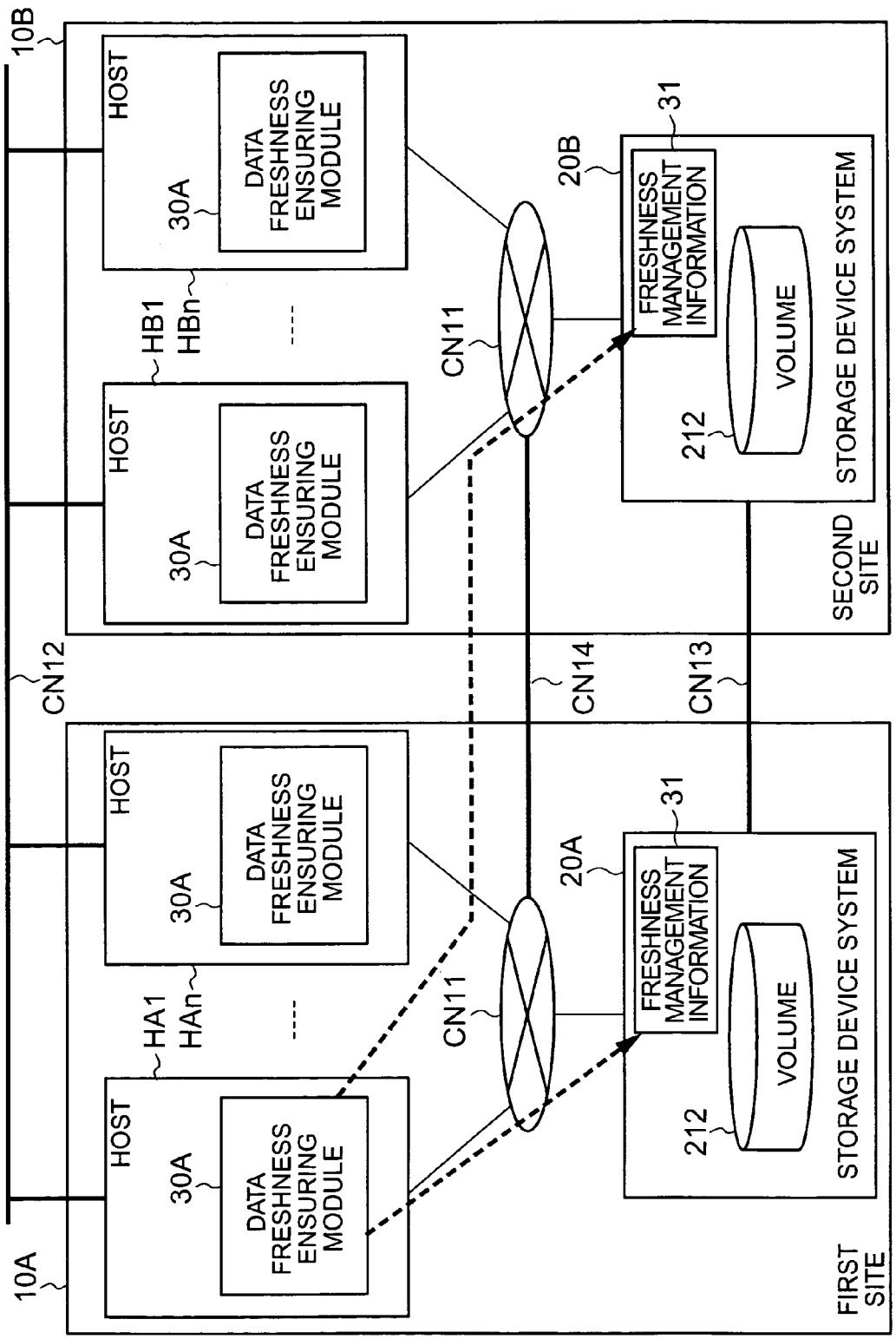
FIG. 28 is a block diagram of a storage system constituting a ninth embodiment.

FIG. 28 is an overall structural diagram of a storage system constituting a ninth embodiment. In this embodiment, as in the eighth embodiment, the freshness management information 31 is stored in the respective storage device systems 20A and 20B of the respective sites 10A and 10B.

A point of difference from the eighth embodiment is that the intra-site networks CN11 of the respective sites 10A and 10B are connected to each other by a network CN14, so that the ensuring modules 30A can store the freshness management information 31 directly in the storage device systems 20A and 20B via the intra-site networks CN11 or the like.

Furthermore, it would also be possible to couple the eighth embodiment and the present embodiment, and thus to provide two pathways for transmitting the freshness management information 31 to the respective storage device system 20A and 20B from the respective ensuring modules 30A, i. e., the network CN12 between host computers, and the intra-site networks CN11. In this way, redundancy is increased by allowing transmission of the freshness management information 31 to the storage device systems 20A and 20B via a plurality of pathways, so that the reliability can be further increased.

10. Tenth Embodiment

Figure 29:
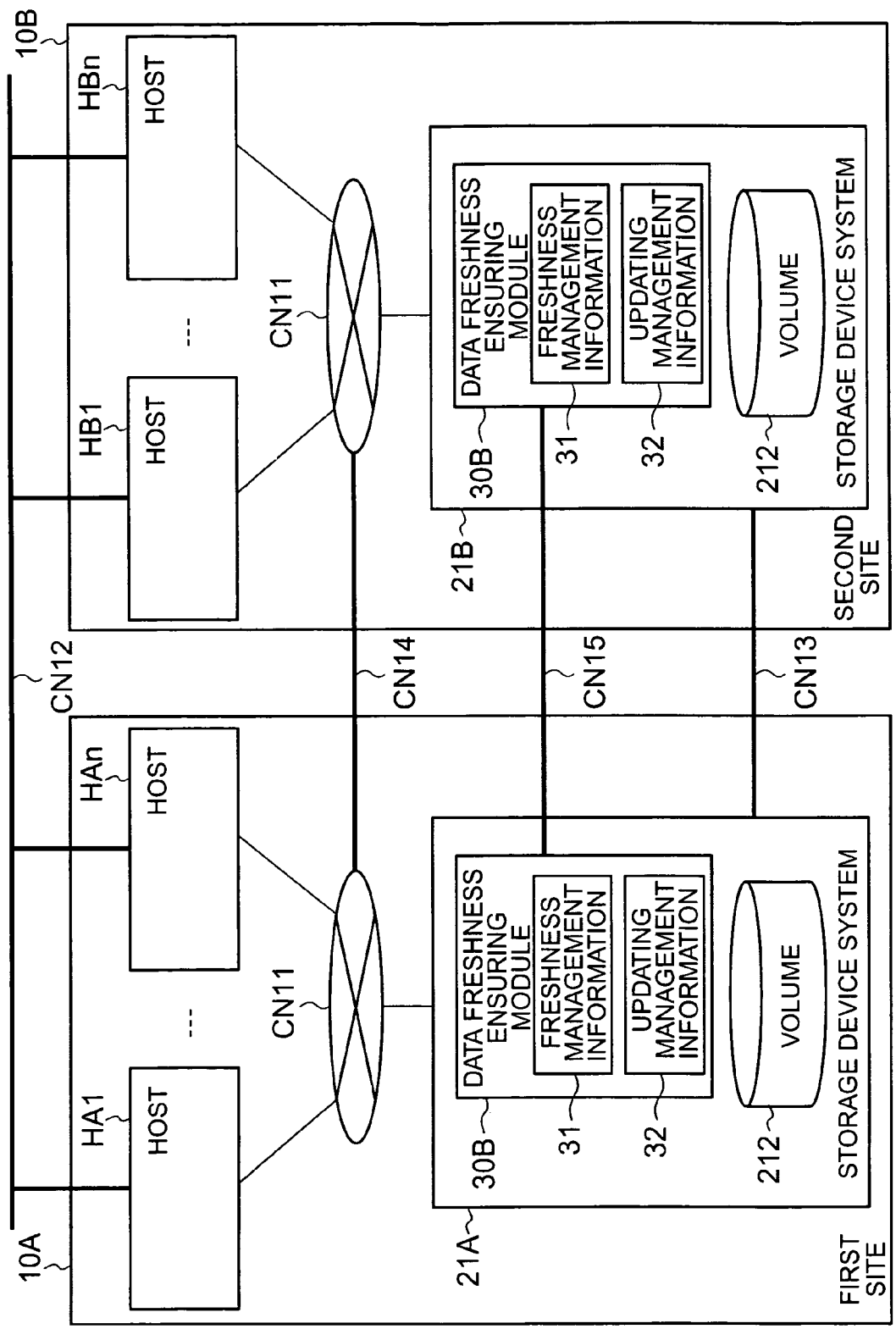
FIG. 29 is a block diagram of a storage system constituting a tenth embodiment.

FIG. 29 is an overall structural diagram of a storage system constituting a tenth embodiment. One of the characterizing features of this embodiment is that ensuring modules 30B are respectively installed inside the respective storage device systems 20A and 20B, and these respective ensuring modules 30B are directly connected to the remote copying line CN13 by a separate network CN15.

Accordingly, in the present embodiment, the data freshness ensuring module processing that was performed by the host computers H can be performed inside the storage device systems 20A and 20B. For example, a SAN, the internet or the like can be used as the network CN15 between the ensuring modules.

11. Eleventh Embodiment

Figure 30:
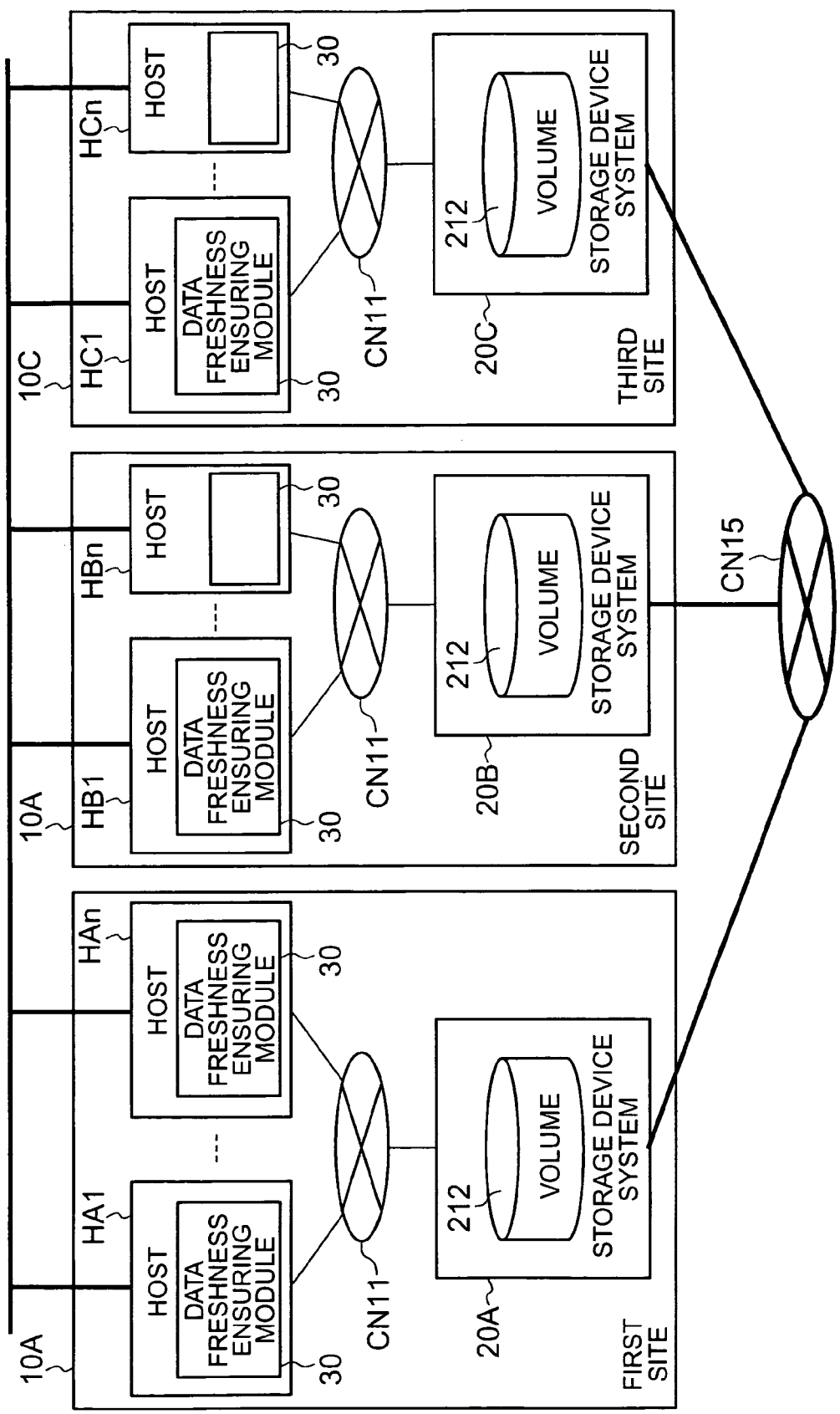
FIG. 30 is a block diagram of a storage system constituting an eleventh embodiment.

FIG. 30 is an overall structural diagram of a storage system constituting an eleventh embodiment. In this embodiment, three volumes are synchronously operated. Specifically, a volume inside a first site 10A, a volume inside a second site 10B and a volume inside a third site 10C are mutually synchronized. Any one of these volumes can constitute a copying source, and the other two volumes constitute copying destinations. Four or more volumes can also be synchronized.

Furthermore, the present invention is not limited to the embodiments described above. A person skilled in the art can make various additions, alterations and the like within the scope of the present invention. For example, a person skilled in the art can appropriately combine the respective embodiments described above.

What is claimed is:

1. A storage system comprising:
   a plurality of sites each comprising a plurality of host computers and a respective storage device providing logical volumes to these host computers, each of said host computers being assigned with access to at least one of said logical volumes;
   an inter-site network that communicably connects the sites to each other;
   a synchronizing part that synchronizes data stored in said logical volumes of said respective storage devices in the sites via said inter-site network;
   a reference managing part which manages reference designating information that designates a logical volume holding the most recent data as a reference volume if a synchronization trouble occurs in the synchronization processing performed by the synchronizing part, said synchronization trouble affecting the normal performance of the synchronization processing performed by the synchronizing part; and a control part that controls failover processing among said host computers on the basis of said reference designating information, wherein if one of said host computers assigned with access to said reference volume fails during said synchronization trouble and prior to a recovery from said synchronization trouble, another one of said host computers assigned with access to said reference volume performs failover processing to take over after said failed host computer using said reference volume, while preventing another one or more of said host computers not assigned with access to said reference volume from performing failover processing to take over after said filed host computer.

2. The storage system according to claim 1, wherein said synchronizing part, said reference managing part and said control part are installed in each of said sites.

3. The storage system according to claim 1, wherein said synchronizing part, said reference managing part and said control part are installed in each of said host computers at said respective sites.

4. The storage system according to claim 1, wherein said synchronizing part and said control part are installed in each of said host computers at said respective sites, and said reference managing part is installed in said storage device at each of said sites.

5. The storage system according to claim 1, wherein said host computers at said respective sites form a single cluster, and
said failover processing causes only a specified service provided by said failed host computer to be taken over by said another host computer.

6. The storage system according to claim 1, wherein said reference managing part sends notification of said reference designating information to a specified site, among said sites, that requires notification of said reference designating information.

7. The storage system according to claim 6, wherein said specified site holds older reference designating information in cases where a plurality of said notifications are received.

8. The storage system according to claim 6, wherein said synchronizing part stops the synchronizing processing of said logical volumes and enables write access to said reference volume by said host computers assigned with access thereto, in cases where said notification to said specified site by said reference managing part is completed in a normal manner.

9. The storage system according to claim 6, wherein information indicating a preferential site is associated with said reference designating information beforehand, and said synchronizing part stops the synchronizing processing of said logical volumes and enables write access to said reference volume by said host computers assigned with access thereto, when said notification to said preferential site is completed in a normal manner, even if said notification to said specified site by said reference managing part is not completed in a normal manner.

10. The storage system according to claim 9, wherein at least one or more of the specified site designated beforehand, the operating site prior to the occurrence of trouble, and the standby site prior to the occurrence of trouble are set as said preferential site.

11. The storage system according to claim 1, wherein said reference managing part updates said reference designating information in cases where the occurrence of said synchronization trouble is detected.

12. The storage system according to claim 6, wherein said inter-site network includes a network between storage devices that communicably connects the storage devices of said sites to each other, and a network between host computers that communicably connects the host computers of said sites to each other,
said synchronizing part synchronizes said logical volumes of said storage devices via said network between storage devices, and
said reference managing part sends notification of said reference designating information to a specified site, among said site, that requires notification of said reference designating information, via said network between host computers.

13. The storage system according to claim 12, wherein said inter-site network further includes a network between intra-site networks, which communicably connects intra-site networks that communicably connect said host computers and said storage device within each of said sites, and
said reference managing part sends notification of said reference designating information to a specified site, among said sites, that requires notification of said reference designating information via either said network between host computers or said network between intra-site networks.

14. The storage system according to claim 1, wherein said reference designating information is caused to be held only in a specified host computer among said host computers of each of said sites, so that the other host computers utilize said reference designating information by accessing said specified host computer.

15. The storage system according to claim 1, wherein said synchronizing part performs said synchronization processing while using the storage device indicated as the copying source storage device in said reference designating information when said synchronization trouble is eliminated.

16. The storage system according to claim 15, wherein said reference managing part resets said reference designating information in cases where said synchronization processing is completed in a normal manner.

17. A storage system comprising:
a first site having a plurality of first host computers and a first storage device that provides first logical volumes to the respective first host computers, each of said first host computers being assigned with access to at least one of said first logical volumes;
a second site having a plurality of second host computers and a second storage device that provides second logical volumes to the respective second host computers, each of said second host computers being assigned with access to at least one of said second logical volumes;
a first intra-site network which communicably connects said first host computers and said first storage device within said first site;
a second intra-site network which communicably connects said second host computers and said second storage device within said second site;
a network between storage devices which communicably connects said first storage device and said second storage device; and
a network between host computers which communicably connects said first host computers and said second host computers; wherein
(A) each of said first host computers and each of said second host computers comprises:
(A1) a cluster control part which forms said first/second host computers into a single cluster as a whole;

(A2) a synchronizing part which synchronizes data stored in said memory volumes of said first storage device with data stored in said memory volumes of said second storage device via said network between storage devices; and (A3) a reference managing part which manages reference designating information that designates a logical volume holding the most recent data as a reference volume if a synchronization trouble occurs in the synchronization processing performed by the synchronizing part, said synchronization trouble affecting the normal performance of the synchronization processing performed by said synchronizing part;

(B) said reference managing part updates said reference designating information and notifies the other site of the updated reference designating information when the occurrence of said synchronization trouble is detected; and (C) said cluster control part controls failover processing among said host computers on the basis of said reference designating information, wherein if one of said host computers assigned with access to said reference volume fails during said synchronization trouble and prior to a recovery from said synchronization trouble, another one of said host computers assigned with access to said reference volume performs failover processing to take over after said failed host computer using said reference volume, while preventing another one or more of said host computers not assigned with access to said reference volume from performing failover processing to take over after said filed host computer.

18. A control method for a storage system comprising a plurality of sites each of which comprises a plurality of host computers and a storage device that provides logical volumes to said host computers, an inter-site network that communicably connects said respective sites to each other, and a synchronizing part that synchronizes data stored in said logical volumes of said storage devices via said inter-site network, each of said host computers being assigned with access to at least one of said logical volumes, said storage system control method comprising:

a detection step of detecting whether or not a synchronization trouble has occurred in a synchronization processing performed by said synchronizing part, the synchronization trouble affecting the normal performance of the synchronization processing;

a production step of producing reference designating information which designates a logical volume holding the most recent as a reference volume if said synchronization trouble is detected;

a notification step of sending notification of the produced reference designating information to a specified site, among said sites, that requires notification of said reference designating information;

a failover processing control step of controlling failover processing among said host computers on the basis of said reference designating information, wherein if one of said host computers assigned with access to said reference volume fails during said synchronization trouble and prior to a recovery from said synchronization trouble, another one of said host computers assigned with access to said reference volume performs failover processing to take over after said failed host computer using said reference volume, while preventing another one or more of said host computers not assigned with access to said reference volume from performing failover processing to take over after said filed host computer; and a stopping step of stopping the synchronizing processing of said logical volumes and enabling write access to said reference volume by said host computers assigned with access thereto, after the notification to said specified sites is completed.

19. The storage system control method according to claim 18, further comprising:

a first judgment step of judging whether or not failover processing is to be executed;

a second judgment step of judging whether or not the logical volume to be used in said failover processing is used on the basis of said reference designating information in cases where said failover processing is judged to be executed;

an execution step of executing said failover processing in cases where the logical volume used in said failover processing is used; and a request step in which the execution of said failover processing is entrusted to another host computer in cases where the logical volume to be used in said failover processing is not used.

20. The storage system control method according to claim 18, wherein said stopping step stops the synchronizing processing of said logical volumes and enables write access to said reference volume by said host computers assigned with access thereto, in cases where said notification to said preset preferential site is completed in a normal manner, even if said notification to said specified site is not completed in a normal manner.

* * * * *